(12) United States Patent
Xue et al.

(10) Patent No.: US 10,751,629 B2
(45) Date of Patent: *Aug. 25, 2020

(54) MULTIPLAYER VIDEO GAME MATCHMAKING SYSTEM AND METHODS

(71) Applicant: Electronic Arts Inc., Redwood City, CA (US)

(72) Inventors: Su Xue, Fremont, CA (US); Kazi Atif-Uz Zaman, Foster City, CA (US); Navid Aghdaie, San Jose, CA (US); John Kolen, Half Moon Bay, CA (US); Zhengxing Chen, Boston, MA (US)

(73) Assignee: Electronic Arts Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/366,409

(22) Filed: Mar. 27, 2019

(65) Prior Publication Data
US 2019/0262718 A1    Aug. 29, 2019

Related U.S. Application Data

(63) Continuation of application No. 15/416,961, filed on Jan. 26, 2017, now Pat. No. 10,286,327.

(60) Provisional application No. 62/411,452, filed on Oct. 21, 2016.

(51) Int. Cl.
| | |
|---|---|
| *A63F 13/35* | (2014.01) |
| *A63F 13/795* | (2014.01) |
| *A63F 13/67* | (2014.01) |
| *A63F 13/48* | (2014.01) |

(52) U.S. Cl.
CPC ............ *A63F 13/795* (2014.09); *A63F 13/35* (2014.09); *A63F 13/48* (2014.09); *A63F 13/67* (2014.09)

(58) Field of Classification Search
CPC ........ A63F 13/795; A63F 13/35; A63F 13/48; A63F 13/67
See application file for complete search history.

(56) References Cited

U.S. PATENT DOCUMENTS

| | | | |
|---|---|---|---|
| 5,813,913 A | 9/1998 | Berner et al. |
| 5,894,556 A | 4/1999 | Grimm et al. |
| 5,961,386 A | 10/1999 | Sawaguchi |
| 5,964,660 A | 10/1999 | James et al. |
| 6,012,096 A | 1/2000 | Link et al. |

(Continued)

OTHER PUBLICATIONS

Agarwal, S., et al., "Matchmaking for online games and other latency-senstive P2P systems." In ACM SIGCOMM Computer Communication Review, vol. 39, pp. 315-326, ACM, 2009.

(Continued)

*Primary Examiner* — David L Lewis
(74) *Attorney, Agent, or Firm* — Knobbe, Martens, Olson & Bear, LLP

(57) ABSTRACT

Embodiments of systems presented herein may identify users to play a multiplayer video game together using a mapping system and machine learning algorithms to create sets of matchmaking plans for the multiplayer video game that increases player or user retention. Embodiments of systems presented herein can determine the predicted churn rate, or conversely retention rate, of a user waiting to play a video game if the user is matched with one or more additional users in a multiplayer instance of the video game.

20 Claims, 8 Drawing Sheets

(56) References Cited

U.S. PATENT DOCUMENTS

| | | | |
|---|---|---|---|
| 6,015,348 A | 1/2000 | Lambright et al. | |
| 6,023,729 A | 2/2000 | Samuel et al. | |
| 6,038,599 A | 3/2000 | Black et al. | |
| 6,128,660 A | 10/2000 | Grimm et al. | |
| 6,322,451 B1 | 11/2001 | Miura | |
| 6,641,481 B1 | 11/2003 | Mai et al. | |
| 6,699,125 B2 | 3/2004 | Kirmse et al. | |
| 6,701,344 B1 | 3/2004 | Holt et al. | |
| 6,714,966 B1 | 3/2004 | Holt et al. | |
| 6,732,147 B1 | 5/2004 | Holt et al. | |
| 6,755,743 B1 | 6/2004 | Yamashita et al. | |
| 6,829,634 B1 | 12/2004 | Holt et al. | |
| 6,910,069 B1 | 6/2005 | Holt et al. | |
| 6,920,497 B1 | 7/2005 | Bourassa et al. | |
| 7,016,942 B1 | 3/2006 | Odom | |
| 7,031,473 B2 | 4/2006 | Morais et al. | |
| 7,169,051 B1 | 1/2007 | Mossbarger | |
| 7,240,093 B1 | 7/2007 | Danieli et al. | |
| 7,264,243 B2 | 9/2007 | Yoseloff et al. | |
| 7,287,076 B2 | 10/2007 | Ewanchuck et al. | |
| 7,288,028 B2 | 10/2007 | Rodriguez et al. | |
| 7,430,719 B2 | 9/2008 | Pettinati et al. | |
| 7,470,197 B2 | 12/2008 | Massey et al. | |
| 7,549,125 B2 | 6/2009 | Dunn et al. | |
| 7,636,719 B2 | 12/2009 | Thompson et al. | |
| 7,846,024 B2 * | 12/2010 | Graepel | G07F 17/3276 463/42 |
| 8,360,845 B1 | 1/2013 | Hsu | |
| 8,782,121 B1 | 7/2014 | Chang | |
| 8,882,588 B2 | 11/2014 | Buhr | |
| 9,199,173 B2 | 12/2015 | Jensen | |
| 9,630,113 B1 | 4/2017 | Jensen | |
| 9,776,091 B1 | 10/2017 | Lebrun et al. | |
| 9,993,735 B2 | 6/2018 | Aghdaie et al. | |
| 10,091,281 B1 | 10/2018 | Lockhart | |
| 10,207,191 B2 | 2/2019 | Jensen | |
| 10,286,327 B2 | 5/2019 | Xue et al. | |
| 10,610,786 B2 | 4/2020 | Aghdaie et al. | |
| 2001/0044339 A1 | 11/2001 | Cordero et al. | |
| 2002/0037767 A1 | 3/2002 | Ebin | |
| 2002/0086732 A1 | 7/2002 | Kirmse et al. | |
| 2002/0119821 A1 | 8/2002 | Sen et al. | |
| 2002/0195775 A1 | 12/2002 | Webb et al. | |
| 2003/0152034 A1 | 8/2003 | Zhang et al. | |
| 2003/0212597 A1 | 11/2003 | Ollins | |
| 2003/0236878 A1 | 12/2003 | Egi | |
| 2004/0097287 A1 | 5/2004 | Postrel | |
| 2004/0116186 A1 | 6/2004 | Shim et al. | |
| 2004/0143852 A1 | 7/2004 | Meyers | |
| 2004/0192440 A1 | 9/2004 | Evans et al. | |
| 2004/0215756 A1 | 10/2004 | VanAntwerp et al. | |
| 2004/0248652 A1 | 12/2004 | Massey et al. | |
| 2004/0255032 A1 | 12/2004 | Danieli | |
| 2005/0033601 A1 | 2/2005 | Kirby et al. | |
| 2005/0091399 A1 | 4/2005 | Candan et al. | |
| 2005/0181878 A1 | 8/2005 | Danieli et al. | |
| 2005/0192097 A1 | 9/2005 | Famham et al. | |
| 2005/0227760 A1 | 10/2005 | Vlazny et al. | |
| 2006/0121990 A1 | 6/2006 | O'Kelley, II et al. | |
| 2006/0217167 A1 | 9/2006 | Jubinville et al. | |
| 2006/0247055 A1 | 11/2006 | O'Kelley, II et al. | |
| 2006/0258463 A1 | 11/2006 | Cugno et al. | |
| 2006/0287096 A1 | 12/2006 | O'Kelley, II et al. | |
| 2006/0287099 A1 | 12/2006 | Shaw et al. | |
| 2007/0035548 A1 | 2/2007 | Jung et al. | |
| 2007/0094279 A1 | 4/2007 | Mittal et al. | |
| 2008/0026846 A1 | 1/2008 | McMaster | |
| 2008/0242420 A1 * | 10/2008 | Graepel | A63F 13/12 463/42 |
| 2008/0311981 A1 | 12/2008 | Schugar | |
| 2009/0098921 A1 | 4/2009 | Manning et al. | |
| 2009/0209349 A1 | 8/2009 | Padhye et al. | |
| 2009/0239650 A1 | 9/2009 | Alderucci et al. | |
| 2009/0239668 A1 | 9/2009 | Han | |
| 2010/0041482 A1 | 2/2010 | Kumar et al. | |
| 2010/0124971 A1 | 5/2010 | Baerlocher et al. | |
| 2010/0197405 A1 | 8/2010 | Douceur et al. | |
| 2010/0273557 A1 | 10/2010 | Miyaki | |
| 2010/0317420 A1 | 12/2010 | Hoffberg | |
| 2011/0252079 A1 | 10/2011 | Werner et al. | |
| 2011/0275432 A1 | 11/2011 | Lutnick et al. | |
| 2012/0283021 A1 | 11/2012 | Riego | |
| 2013/0007013 A1 * | 1/2013 | Geisner | A63F 13/12 707/748 |
| 2013/0023329 A1 | 1/2013 | Saunders | |
| 2013/0045803 A1 | 2/2013 | Kang et al. | |
| 2013/0132519 A1 | 5/2013 | Walsh et al. | |
| 2013/0165234 A1 | 6/2013 | Hall et al. | |
| 2013/0210527 A1 | 8/2013 | Kim et al. | |
| 2013/0262203 A1 | 10/2013 | Frederick et al. | |
| 2013/0288759 A1 | 10/2013 | Rom et al. | |
| 2014/0189065 A1 | 7/2014 | van der Schaar et al. | |
| 2014/0274402 A1 * | 9/2014 | Michel | A63F 13/12 463/42 |
| 2015/0011310 A1 | 1/2015 | Lockton et al. | |
| 2015/0038234 A1 | 2/2015 | Bojorquez et al. | |
| 2015/0148127 A1 | 5/2015 | Saraf et al. | |
| 2015/0375104 A1 | 12/2015 | Nishar et al. | |
| 2016/0005270 A1 | 1/2016 | Marr et al. | |
| 2016/0255139 A1 | 9/2016 | Rathod | |
| 2016/0332081 A1 | 11/2016 | Marr et al. | |
| 2017/0259178 A1 | 9/2017 | Aghdaie et al. | |
| 2017/0291109 A1 | 10/2017 | Jensen | |
| 2018/0065045 A1 | 3/2018 | Lebrun et al. | |
| 2018/0111051 A1 | 4/2018 | Xue et al. | |
| 2018/0369696 A1 | 12/2018 | Aghdaie et al. | |
| 2019/0282907 A1 | 9/2019 | Jensen | |

OTHER PUBLICATIONS

Agresti, A., et al., "Categorical Data Analysis." Springer, 2011.

Bell, C. E., Weighted matching with vertex weights: An application to scheduling training sessions in NASA space shuttle cockpit simulators. European Journal of Operational Research, 73(3):443-449, 1994.

Berge, C., "Hypergraphs: combinatorics of finite sets", vol. 45. Elsevier, 1984.

Bernhaupt, R., "User experience evaluation in entertainment. In Evaluating User Experience in Games", pp. 3-7. Springer, 2010.

Bradley, R. A., et al., "Rank analysis of incomplete block designs: I. The method of paired comparisons." Biometrika, 39(3/4):324-345, 1952.

Delalleau, E., et al., "Beyond Skill Rating: Advanced Matchmaking in Ghost Recon Online." IEEE Transactions on Computational Intelligence and AI in Games, 4(3):167-177, Sep. 2012.

Drake, D. E., et al., "A simple approximation algorithm for the weighted matching problem." Information Processing Letters, 85(4):211-213, 2003.

Duan, R., et al., "Linear-time approximation for maximum weight matching." Joural of the ACM (JACM), 61(1):1, 2014.

Edmonds, J., "Maximum matching and a polyhedron with 0, 1-vertices." J. Res. Nat. Bur. Standards B, 69(1965):125-130, 1965.

Edmonds, J., "Paths, trees, and flowers." Canadian Journal of Mathematics, 17(3):449-467, 1965.

Elo, A. E., "The rating of chessplayers, past and present." Arco Pub., 1978.

Ferreira, J., et al., "Data mining techniguques on the evaluation of wireless churn." In ESANN, pp. 483-488, 2004.

Gabow, H. N., "A scaling algoritm for weighted matching on general graphs." In Foundations of Computer Science, 1985., 26the Annual Symposium on, pp. 90-100, IEEE, 1985.

Gabow, H. N., "Implementation of algorithms for maximum matching on nonbipratite graphs." 1974.

Glickman, M. E., "Parameter estimation in large dynamic paired comparison experiments." Applied Statistics, pp. 377-394, 1999.

Grapel, T., et al., "Ranking and Matchmaking." Game Developer Magazine, 25:34, 2006.

Hadiji, F., et al., "Predicting player chrun in the wild." In 2014 IEEE Conference on Computational Intelligence and Games, pp. 1-8, IEEE, 2014.

(56) References Cited

OTHER PUBLICATIONS

Herbrich, R., et al., "Trueskill: A bayesian skill rating system." pp. 569-576. Advances in Neural Information Processing Systems, 2006.
Huang, T.-K., et al., A generalized Bradley-Terry model: From group competition to individual skill. In Advances in Neural Information Processing Systems, pp. 601-608, 2004.
International Search Report Application PCT/US/06/18957 dated Aug. 17, 2007.
Jimenez-Rodriguez, J., et al., Matchmaking and case-based recommendations. 2011.
Lawler, E. L., "Combinatorial Optimization: Networks and Matroids." Courier Corporation, 2001. (Part 1 of 2).
Lawler, E. L., "Combinatorial Optimization: Networks and Matroids." Courier Corporation, 2001. (Part 2 of 2).
Lee et al; Adaptive Server Selection for Large Scale Interactive Online Games. ACM Press, 2004.
Lee, Y., et al., "Measurement and estimation of network QoS among peer Xbox 360 game players." In International Conference on Passive and Active Network Measurement, pp. 41-50. Springer, 2008.
Manweiler, S., et al., "Switchboard: a matchmaking system for multiplayer mobile games." In Proceedings of the 9th international conference on Mobile systems, applications, and services, pp. 71-84. ACM, 2011.
Menke, J. E., et al., "A Bradley-Terry artificial neural network model for individual ratings in gropu competitions." Neural computing and Applications, 17(2): 175-186, 2008.
Minotti, M., Comparing MOBAs: League of Legends vs. Dota 2 vs. Smite vs. Heroes of the Storm. Http://venturebeat.com/2015/07/15/comparing-mobas-league-of-legends-vs-dota-2-vs-smite-vs-heroes-of-the-storm/, 2016. Online; accessed May 2016.
Morik, K., et al., "Analysing customer churn in insurance date—a case study." In European Conferecne on Principles of Data Mining and Knowledge Discovery, pp. 325-336. Springer, 2004.
Myslak. M., et al., "Developing game-structure sensitive matchmaking system for massive-multiplayer online games." In Social Informatics, pp. 200-208. Springer, 2014.
Nguyen, T.-H. D., et al., "Analytics-based A1 Techniques for Better Gaming Experience", vol. 2 of Game A1 Pro. CRC Press, Boca Raton, Florida, 2015.
Olafsson, S., "Weighted matching in chess tournaments." Journal of the Operational Research Society, 41(1): 17-24, 1990.
Osiakwan, C. N., et al., "The maximum weight perfect matching problem for complete weighted graphs is in pc." In Parallel and Distributed Processing. 1990. Proceedings of the Second IEEE Symposium on, pp. 880-887. IEEE, 1990.
Riskin, E. A., et al., Index assignment for progressive transmission of full-search vector quantization. IEEE Transactions on Image Processing, 3(3):307-312, 1994.
Runge, J., et al., "Churn prediction for high-value players in casual social games." In 2014 IEEE Conference on Computational Intelligence and Games, pp. 1-8, IEEE, 2014.
SuperData. eSports market brief: US accounts for almost half of total viewership. https://www.superdataresearch.com/blog/esports/-brief/, 2016. Online; accessed Mar. 2016.
Tassi, P., Riot's League of Legends' Reveals Astonishing 27 Million Daily Players, 67 Million Monthly. Http://www.forbes.com/sites/insertcoin/2014/01/27/riots-league-of-legends-reveals-astonishing-27-million-daily-players-67-million-monthly/#26ff8e543511, 2016. Online; accessed May 2016.
Van Rantwijk, J., "Maximum Weighted Matching." http://jorisvr.nl/article/maximum-matching, 2013. Online; accessed May 2016.
Weber, B. G., et al., Modeling player retention in madden nfl 11. In IAAI. 2011.
Yannakakis, G., et al., Player Modeling. In Artificial and Computational Intelligence in Games, pp. 45-59. 2013.
Yoon, S., et al., Prediction of advertiser churn for google adwords. 2010.

\* cited by examiner in the accompanying drawings and the description below.
MULTIPLAYER VIDEO GAME MATCHMAKING SYSTEM AND METHODS

INCORPORATION BY REFERENCE TO ANY PRIORITY APPLICATIONS

This disclosure is a continuation of U.S. application Ser. No. 15/416,961, which was filed on Jan. 26, 2017 and is titled "MULTIPLAYER VIDEO GAME MATCHMAKING SYSTEM AND METHODS," the disclosure of which is hereby expressly incorporated by reference herein in its entirety for all purposes, and which claims priority to U.S. Provisional Application No. 62/411,452, which was filed on Oct. 21, 2016 and is titled "Engagement Optimized Matchmaking Framework," the disclosure of which is hereby expressly incorporated by reference herein in its entirety for all purposes. Any and all applications for which a foreign or domestic priority claim is identified in the Application Data Sheet as filed with the present application are hereby incorporated by reference under 37 CFR 1.57.

BACKGROUND

Software developers typically desire for their software to engage users for as long as possible. The longer a user is engaged with the software, the more likely that the software will be successful. The relationship between the length of engagement of the user and the success of the software is particularly true with respect to video games. The longer a user plays a particular video game, the more likely that the user enjoys the game and thus, the more likely the user will continue to play the game.

The principle of engagement is not limited to single player games and can also be applied to multiplayer video games. Video games that provide users with enjoyable multiplayer experiences are more likely to have users play them again. Conversely, video games that provide users with poor multiplayer experiences are less likely to maintain a high number of users. Thus, one of the challenges of video game development is to provide a mechanism that ensures or increases the probability of an enjoyable multiplayer experience.

SUMMARY OF EMBODIMENTS

The systems, methods and devices of this disclosure each have several innovative aspects, no single one of which is solely responsible for the all of the desirable attributes disclosed herein. Details of one or more implementations of the subject matter described in this specification are set forth in the accompanying drawings and the description below.

Certain embodiments of the present disclosure relate to a computer-implemented method that may be implemented by an interactive computing system configured with specific computer-executable instructions. The method may include selecting a plurality of users from a pool of users. The pool of users may include users available for selection to play an instance of a video game. At least a first portion of the instance of the video game may execute on a user computing device of at least one user from the plurality of users and a second portion of the instance of the video game may execute on the interactive computing system. Further, the method may include creating a connected graph comprising a plurality of vertexes and a plurality of edges. Each vertex may be connected by at least one edge from the plurality of edges and each vertex may represent a different user from the plurality of users. The method may include accessing user interaction data for each user of the plurality of users. The user interaction data may correspond to the user's interaction with the video game. For each edge in the connected graph, the method may include assigning a weight to the edge based at least in part on a first churn risk of a first user corresponding to a first node of the edge and a second churn risk of a second user corresponding to a second node of the edge. The first churn risk may be based at least in part on the user interaction data for the first user and the second churn risk may be based at least in part on the user interaction data for the second user. Moreover, the method may include selecting a set of edges from the connected graph to obtain a set of selected edges based at least in part on the weights assigned to each edge within the connected graph. Each vertex in the connected graph may be connected to at least one edge within the set of selected edges. Further, the method may include initiating a playable instance of the video game using at least a pair of users corresponding to vertexes of one or more edges included in the set of selected edges.

Other embodiments of the present disclosure relate to a system that may include an electronic data store configured to store user interaction data for users of a video game and a hardware processor in communication with the electronic data store. The hardware processor may be configured to execute specific computer-executable instructions to at least select a plurality of users available to play an instance of a video game. At least a first portion of the instance of the video game may execute on a user computing device of at least one user from the plurality of users and a second portion of the instance of the video game may execute on the interactive computing system. Further, the hardware processor may be configured to execute specific computer-executable instructions to at least create a connected graph with each vertex representing a different user from the plurality of users and to access user interaction data from the electronic data store for each user of the plurality of users. The user interaction data may correspond to the user's interaction with the video game. For each edge in the connected graph, the hardware processor may be configured to execute specific computer-executable instructions to at least assign a weight to the edge based at least in part on a first churn risk of a first user corresponding to a first node of the edge and a second churn risk of a second user corresponding to a second node of the edge. The first churn risk may be based at least in part on the user interaction data for the first user and the second churn risk may be based at least in part on the user interaction data for the second user. Moreover, the hardware processor may be configured to execute specific computer-executable instructions to at least select a set of edges from the connected graph based at least in part on the weights assigned to each edge within the connected graph. Each vertex in the connected graph may be connected to at least one edge within the set of selected edges. In addition, the hardware processor may be configured to execute specific computer-executable instructions to at least initiate a playable instance of the video game using at least two users corresponding to vertexes of one or more edges included in the set of selected edges.

Yet, other embodiments of the present disclosure relate to a non-transitory computer-readable storage medium storing computer executable instructions that, when executed by one or more computing devices, may configure the one or more computing devices to perform operations comprising selecting a plurality of users from a pool of users who are available to play an instance of a video game. At least a first portion of the instance of the video game may execute on a user computing device of at least one user from the plurality of users and a second portion of the instance of the video game may execute on the interactive computing system. Further, the operations may include creating a connected graph with each vertex representing a different user from the plurality of users and accessing user interaction data for each user of the plurality of users. The user interaction data may correspond to the user's interaction with the video game. For each edge in the connected graph, the operations may include assigning a weight to the edge based at least in part on a first churn risk of a first user corresponding to a first node of the edge and a second churn risk of a second user corresponding to a second node of the edge. The first churn risk may be based at least in part on the user interaction data for the first user and the second churn risk may be based at least in part on the user interaction data for the second user. Moreover, the operations may include selecting a set of edges from the connected graph based at least in part on the weights assigned to each edge within the connected graph. Each vertex in the connected graph may be connected to one or more edges within the set of selected edges. Further, the operations may include initiating a playable instance of the video game using a plurality of users corresponding to vertexes of one or more edges included in the set of selected edges.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

DETAILED DESCRIPTION OF EMBODIMENTS

Introduction

Figure 1A:
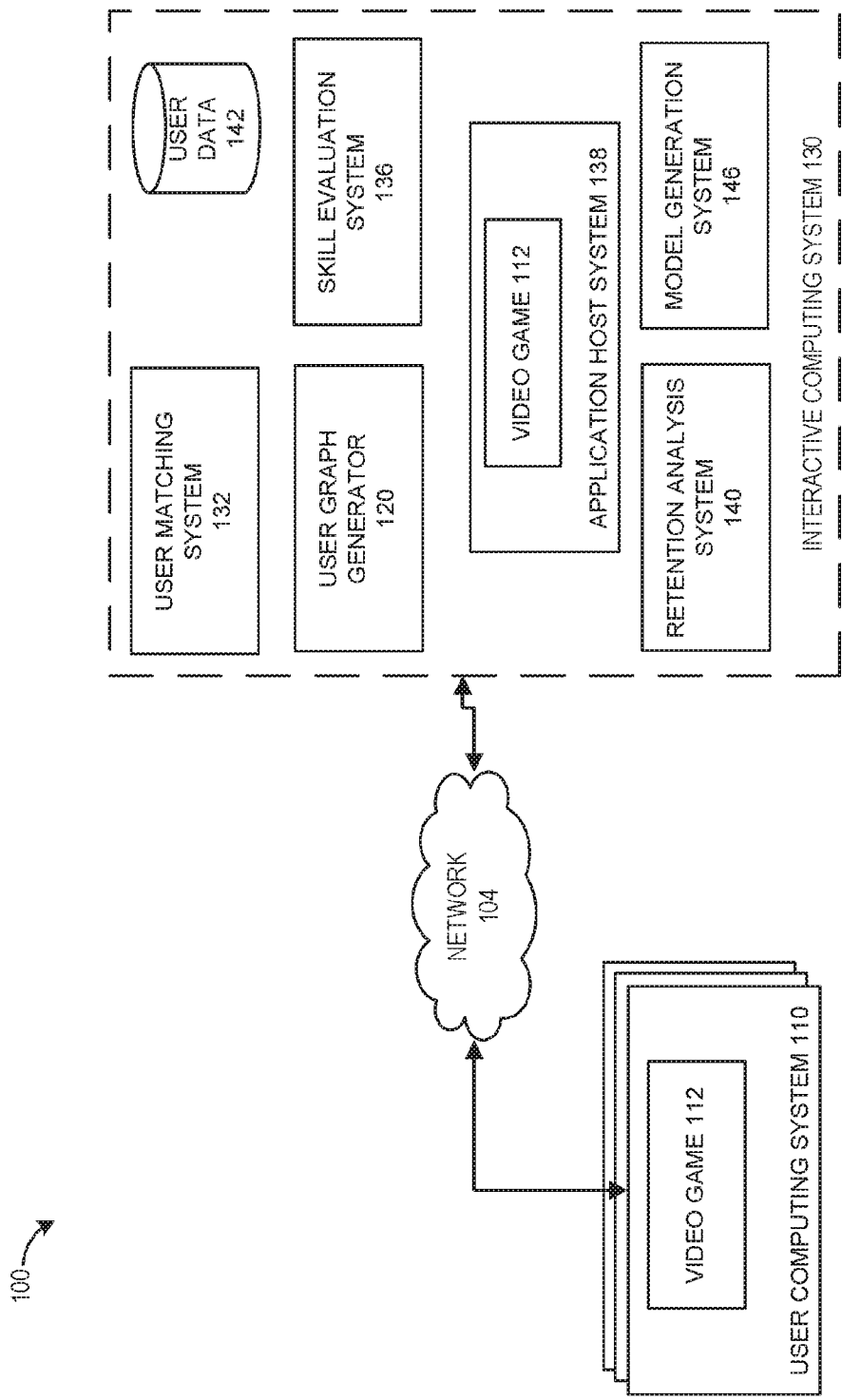
FIG. 1A illustrates an embodiment of a networked computing environment that can implement one or more embodiments of a dynamic user matchmaking system for a video game.

It is generally desirable for a video game to appeal to a large number of users. This principle is also true for multiplayer video games. Multiplayer video games can include video games where two or more users play against each other, video games where two or more users play on the same team, and/or video games where teams of multiple users play against each other.

Multiplayer games with poor matchmaking algorithms can result in lower engagement by users. In other words, poorly matched opponents and/or teammates may result in users ceasing to play a video game or playing the video game less often than if the multiplayer game has better matchmaking algorithms. Poor matchmaking may include, among other things, matching users of incompatible or inadequately paired skill levels or contradicting play style preferences. For some users, being paired with a user of a different skill level or a different play style may be undesirable and may be considered poor matchmaking. But, for other users, being paired with a user of a different skill level or a different play style may be desirable. Thus, determining whether matchmaking is poor or is good can depend on the specific users analyzed by the matchmaking algorithms.

Embodiments presented herein use a graph mapping system and machine learning algorithms to identify sets of matchmaking plans for a multiplayer video game that optimizes or increases player or user retention. Systems presented herein can determine the predicted churn rate, or conversely retention rate, of a user waiting to play a video game for different matchups of the user with one or more additional users in a multiplayer instance of the video game. Further, embodiments of the systems herein can generate a graph topology of the users and perform one or more edge selection algorithms based at least in part on the determined churn, or retention, rates to optimize or increase the quality of player matchmaking with respect to retention or churn rate. Example embodiments of systems and algorithms that can be used to determine a retention rate and for generating a match plan using the retention rate are described in U.S. application Ser. No. 15/064,115, filed on Mar. 8, 2016 and titled "MULTIPLAYER VIDEO GAME MATCHMAKING OPTIMIZATION," which is hereby incorporated by reference in its entirety and for all purposes herein.

To simplify discussion, this disclosure primarily focuses on increasing user retention or reducing the churn rate of users playing the multiplayer video game. However, the objective is not limited as such, and embodiments of the present disclosure can be used to optimize or increase the likelihood of one or more additional or alternative objectives. For example, the objectives may include one or more of: increasing in-game spending of virtual or real currency; decreasing undesirable behavior (for example, foul language or harassment of other users) within the video game, or reducing the occurrence of users prematurely exiting an instance of the video game.

To simplify discussion, the present disclosure is primarily described with respect to a video game. However, the present disclosure is not limited as such and may be applied to other types of applications. For example, embodiments disclosed herein may be applied to educational applications (for example, applications that help users learn a new language) or other applications that may pair together two or more users in a group.

Example Networked Computing Environment

FIG. 1A illustrates an embodiment of a networked computing environment 100 that can implement one or more embodiments of a dynamic user matchmaking system for a video game 112. The networked computing environment 100 includes a plurality of user computing systems 110 that can communicate with an interactive computing system 130 via a network 104.

At least some of the user computing systems 110 may include, host, or execute a video game 112. In some embodiments, user computing system 110 can host or execute a portion of the video game 112 and the application host system 138 can host and/or execute a portion of the video game 112. When a user initiates execution of the video game 112 on the user computing system 110, a network connection may be established with the interactive computing system 130 and the two portions of the video game 112 may execute in conjunction with each other. For example, the application host system 138 may host and execute a portion of the video game 112 that comprises a video game environment while the user computing system 110 may execute a portion of the video game 112 that enables a user to interact with the video game environment using, for example, a playable in-game character. The video game environment may include an online or digital persistent world that may be maintained after a user of the user computing system 110 disconnects from the application host system 138. As another example, the video game may be a massively multiplayer online role-playing game (MMORPG) that includes a client portion executed by the user computing system 110 and a server portion executed by one or more application host systems (not shown) that may be included as part of the interactive computing system 130.

As previously mentioned, the application host system 138 may host and/or execute at least a portion of the video game 112. Alternatively, or in addition, the application host system 138 may host or execute the entirety of the video game 112 and a user may interact with the video game 112 using the user computing system 110.

The user computing system 110 may include hardware and software components for establishing communication with another computing system, such as the interactive computing system 130, over a communication network 104. For example, the user computing system 110 may be equipped with networking equipment and network software applications (for example, a web browser) that facilitate communications via a network (for example, the Internet) or an intranet. The user computing system 110 may include a number of local computing resources, such as central processing units and architectures, memory, mass storage, graphics processing units, communication network availability and bandwidth, and so forth. Further, the user computing system 110 may include any type of computing system. For example, the user computing system 110 may include any type of computing device(s), such as desktops, laptops, video game platforms, television set-top boxes, televisions (for example, Internet TVs), network-enabled kiosks, car-console devices, computerized appliances, wearable devices (for example, smart watches and glasses with computing functionality), and wireless mobile devices (for example, smart phones, PDAs, tablets, or the like), to name a few. In some embodiments, the user computing system 110 may include one or more of the embodiments described below with respect to FIG. 5 and FIG. 6.

As previously discussed, it may be desirable to maintain or increase a user's level of engagement with the video game 112. One solution for maintaining or increasing the user's level of engagement with the video game 112 includes matching a user with other users who have play characteristics, or application interactivity characteristics, that the user desires or tends to prefer in opponents and/or teammates. These play characteristics may include characteristics relating to skill level, play style (for example, a user who plays defensively, plays offensively, plays a support role, prefers stealth attacks, prefers to use magic abilities, or prefers to use melee abilities, and the like), and/or sportsmanship (for example, a user who is a gracious winner or loser, is or is not gregarious, or does not insult other users, and the like). It should be noted that although the term play characteristics is used, the play characteristics are not necessarily limited to characteristics related to playing the video game 112. In some embodiments, the play characteristics may include one or more additional or alternative characteristics relating to matching users for a multiplayer game. These additional or alternative characteristics may include characteristics that relate to improving the play experience of users in a multiplayer game. For example, the additional or alternative characteristics may include user geographic location, user location within a network, characteristics of a user computing system 110 of a user, and network characteristics of a portion of a network (such as the last mile, or the home network of the user) in communication with the user computing system 110 of a user, and the like.

The play characteristics may be determined based at least in part on user interaction data for one or more users and/or express requests or indications from the one or more users. Further, the play characteristics that a user desires or tends to prefer in opponents and/or teammates may be determined based at least in part on user interaction data for the user.

Interactive computing system 130 may include a number of systems or subsystems for facilitating the determination of the play characteristics of a particular user of the video game 112 and/or the desired play characteristics of opponent and/or teammate users for the particular user of the video game 112. Further, the interactive computing system 130 may include a number of systems and subsystems for facilitating matchmaking of users of the video game 112 based at least in part on the play characteristics of the users. These systems or subsystems can include a user graph generator 120, a user matching system 132, a skill evaluation system 136, an application host system 138, a user data repository 142, a retention analysis system 140, and a model generation system 146. Each of these systems may be implemented in hardware, and software, or a combination of hardware and software. Further, each of these systems may be implemented in a single computing system comprising computer hardware or in one or more separate or distributed computing systems. Moreover, while these systems are shown in FIG. 1A to be stored or executed on the interactive computing system 130, it is recognized that in some embodiments, part or all of these systems can be stored and executed on the user computing system 110.

The user graph generator 120 generates a graph of a set of users that are waiting to play an instance of a video game. The set of users may include all users waiting to play the instance of the video game or a subset of users that may be selected using a selection process, such as first come-first served or threshold number of users matching a skill level range. The users may be represented by nodes or vertices in the graph and potential matchups, as either teammates or opponents, may be represented by edges between the nodes or vertices. Further, the user graph generator 120 may weight edges based at least in part on one or more selected objectives. For example, the edges may be weighted based on a churn rate for the users connected by an edge in the graph. It is recognized that other data structures may also be used to represent the data stored in the graph, such as, for example, an adjacency matrix, a matrix, an edge list, an adjacency list, a node listing, and so forth.

The user matching system 132 identifies or matches two or more users together for playing the video game 112. The two or more users may be matched as opponents, teammates, or a combination of opponents and teammates. To identify users to be matched as opponents or teammates, the user matching system 132 may access a user graph generated by the user graph generator 120. Further, the user matching system 132 may solve a minimum or maximum weight matching problem on the graph generated by the user graph generator 120 to identify a pairing or match plan of users to play an instance of the video game 112.

The model generation system 146 can use one or more machine learning algorithms to generate one or more prediction models or parameter functions. One or more of these parameter functions may be used to determine an expected value or occurrence based on a set of inputs. For example, a prediction model can be used to determine an expected churn rate or a probability that a user will cease playing the video game 112 based on one or more inputs to the prediction model, such as, for example, historical user interaction information for a user. As another example, a prediction model can be used to determine an expected amount of money spent by the user on purchasing in-game items for the video game based on one or more inputs to the prediction model. In some cases, the prediction model may be termed a prediction model because, for example, the output may be or may be related to a prediction of an action or event, such as the prediction the user continues to play the video game 112. A number of different types of algorithms may be used by the model generation system 146. For example, certain embodiments herein may use a logistical regression model. However, other models are possible, such as a linear regression model, a discrete choice model, or a generalized linear model.

The machine learning algorithms can be configured to adaptively develop and update the models over time based on new input received by the model generation system 146. For example, the models can be regenerated on a periodic basis as new user information is available to help keep the predictions in the model more accurate as the user information evolves over time. The model generation system 146 is described in more detail herein. After a model is generated, it can be provided to the retention analysis system 140.

Some non-limiting examples of machine learning algorithms that can be used to generate and update the parameter functions or prediction models can include supervised and non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, Apriori algorithms), artificial neural network algorithms (such as, for example, Perceptron), deep learning algorithms (such as, for example, Deep Boltzmann Machine), dimensionality reduction algorithms (such as, for example, Principal Component Analysis), ensemble algorithms (such as, for example, Stacked Generalization), and/or other machine learning algorithms.

The retention analysis system 140 can include one or more systems for determining a predicted churn or retention rate for a user based on the application of user interaction data for the user and user interaction data for additional users included in a match plan to a prediction model, such as a prediction model generated by the model generation system 140. In some cases, the user matching system 132 may use the predicted retention rate determined by the retention analysis system 140 to determine whether to select the match plan, or to generate a new match plan for playing an instance of the video game 112. For example, the user matching system 132 can solve a minimum weighting problem based on the application of the predicted retention rates to edges of a user graph created by the user graph generator 120. In some cases, determining whether to select the match plan includes matching the retention rate to data in a repository (not shown) that indicates whether or not to select a new match plan.

Further, generation and application of the parameter functions or prediction models and their use in creating a match plan or determining whether to select a match plan for playing an instance of the video game 112 will be described in further detail below with respect to the retention analysis system 140. In certain embodiments, the user matching system 132 may be or may include the model generation system 146. Moreover, in some cases, the user matching system 132 may be or may include the retention analysis system 140 or the user graph generator 120.

In some embodiments, the retention analysis system 140 may receive a particular match plan and user interaction data, features, and/or metadata associated with each user included in the match plan. The retention analysis system 140 can then output a retention rate and/or a predicted spending amount for each individual user included in the match plan and/or for the match plan itself. For example, the retention analysis system 140 may receive a match plan that includes users A1, A2, and A3 on one team and users B1, B2, and B3 on another team. Using user interaction data for each of the six users, the retention analysis system 140 can determine a retention rate for each user, a retention rate for the match plan, a predicted amount of spending for each user, and/or a predicted amount of spending in total for the match plan.

The skill evaluation system 136 can evaluate a skill level of the user accessing or playing the video game 112. The skill level of the user may be determined based at least in part on user interaction data related to the user's access of the video game 112. In some cases, the skill evaluation system 136 may determine a general skill for the user playing the video game 112. In other cases, the skill evaluation system 136 may evaluate a plurality of different skills associated with playing the video game 112. These skills may vary based on the type of video game. For example, in a sports game, the skills may relate to the ability of the user to select the right play, the best play, or best play strategy when playing the video game 112. As a second example, in a first-person shooter game, the skills may relate to the accuracy of the user in shooting at an enemy within the video game 112. The skill level information may be associated with the user at the user data repository 142.

The user data repository 142 can store user interaction information associated with one or more users' interaction with the video game 112 and/or one or more other video games. This user interaction information or data may include any type of information that can be used to determine a user's play characteristics (such as skill level) and a user's desired play characteristics for opponents and/or teammates. Further, the user interaction information may be used to determine the user's level of engagement with the video game 112 when playing with or against users associated with various play characteristics. For example, some non-limiting examples of the user interaction information may include information relating to actions taken by the user within the video game 112; the level of success of the user; a measure of the user's progress within the video game 112; whether the user was successful at performing specific actions within the video game 112 or completing particular objectives within the video game 112; how long it took the user to complete the particular objectives; how many attempts it took the user to complete the particular objectives; how much money the user spent with respect to the video game 112, which may include one or both of the amount of money spent to obtain access to the video game 112 and the amount of money spent with respect to the video game 112 exclusive of money spent to obtain access to the video game 112; how frequently the user accesses the video game 112; how long the user plays the video game 112; whether the user continues playing during a play session after a defeat or failure to satisfy an objective, or the like. Each of these types of user interaction information may be collected, divided, weighted, and/or characterized based at least in part on play characteristics of other users that play with or against the user. For example, the user interaction information relating to the level of success of the user when playing the video game 112 may be weighted or categorized differently based on play characteristics of teammates. For instance, the level of success of the user may be weighted higher or lower based on whether the play characteristics of a teammate indicate that the teammate has a lower or higher skill level than the user.

Generally, the user interaction information may be monitored and/or obtained by systems of the interactive computing system 130. However, in some cases, the user computing system 110 may monitor and/or obtain at least some of the user interaction information. In such cases, the user computing system 110 may share the user interaction information with the interactive computing system 130 via the network 104. In some embodiments, some or all of the user interaction information is not stored by the video game 112, but is instead provided to or determined by another portion of the user computing system 110 external to the video game 112 and/or by the interactive computing system 130. Each of the repositories described herein may include non-volatile memory or a combination of volatile and nonvolatile memory.

The network 104 can include any type of communication network. For example, the network 104 can include one or more of a wide area network (WAN), a local area network (LAN), a cellular network, an ad hoc network, a satellite network, a wired network, a wireless network, and so forth. Further, in some cases, the network 104 can include the Internet.

Example Model Generation System

Figure 1B:
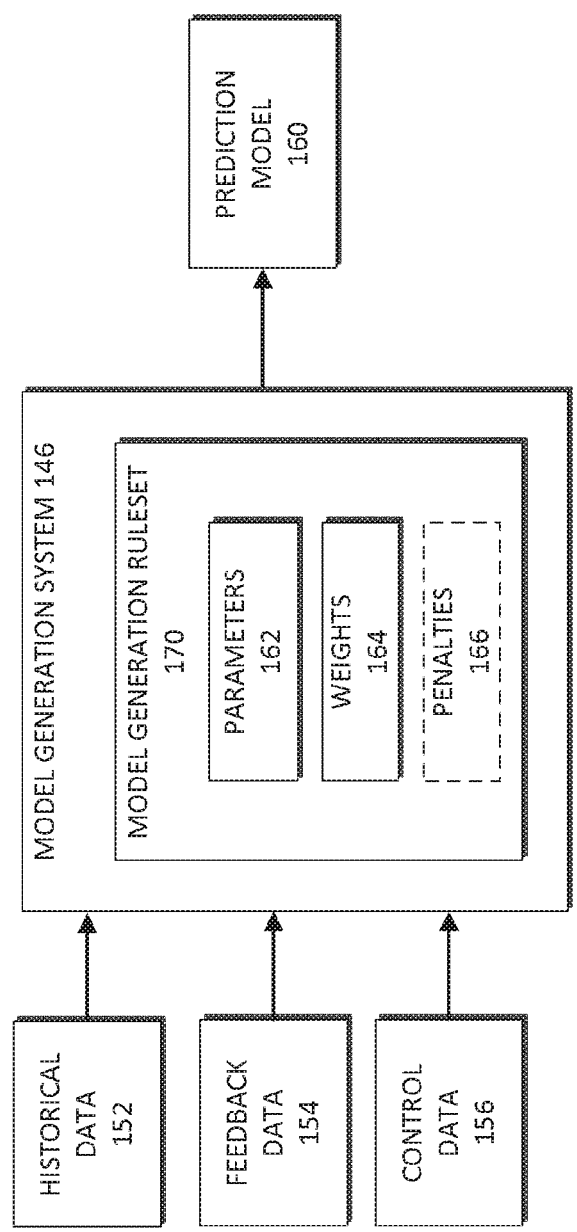
FIG. 1B illustrates an embodiment of a model generation system of FIG. 1A.

FIG. 1B illustrates an embodiment of the model generation system 146 of FIG. 1A. The model generation system 146 may be used to generate or determine one or more prediction models 160 based on historical data 152 for a number of users. Typically, although not necessarily, the historical data 152 includes data associated with a large number of users, such as hundreds, thousands, hundreds of thousands, or more, users. However, the present disclosure is not limited as such, and the number of users may include any number of users. Further, the historical data 152 can include data received from one or more data sources, such as, for example, an application host system (not shown) and/or one or more user computing systems 112. Moreover, the historical data 152 can include data from different data sources, different data types, and any data generated by one or more user's interaction with the video game 112. In some embodiments, the historical data 152 may include a very large number of data points, such as millions of data points, which may be aggregated into one or more data sets. In some cases, the historical data 152 may be accessed from a user data repository 142. In some embodiments, the historical data 152 is limited to historical information about the video game, but in other embodiments, the historical data 152 may include information from one or more other video games.

Further, in some embodiments, one or more subsets of the historical data are limited by a date restriction, such as limited to include data from the last 6, 9, or 12 months.

The historical data 152 may include user interaction data for the users with respect to the video game 112. Further, the historical data 152 may include information relating to opponents and/or teammates of the users.

The model generation system 146 may, in some cases, also receive feedback data 154. This data may be received as part of a supervised model generation process that enables a system user, such as an administrator, to provide additional input to the model generation system 146 that may be used to facilitate generation of the prediction model 160. For example, if an anomaly exists in the historical data 152, the system user may tag the anomalous data enabling the model generation system 146 to handle the tagged data differently, such as applying a different weight to the data or excluding the data from the model generation process.

Further, the model generation system 146 may receive control data 156. This control data 156 may identify one or more features or characteristics for which the model generation system 146 is to determine a model. Further, in some cases, the control data 156 may indicate a value for the one or more features identified in the control data 156. For example, suppose the control data 156 indicates that a prediction model is to be generated using the historical data 152 to determine a length of time that the users played the video game 112. If the amount of time each user played the game is known, this data may be provided as part of the control data 156, or as part of the historical data 152. As another example, if the prediction model is to be generated to estimate a retention rate as determined, for example, based on whether the users played the video game 112 for a threshold period of time or continue to play the video game 112 after a particular threshold period of time, the control data 156 may include the retention rate, opponent data, and/or teammate data for the users whose data is included in the historical data 152.

The model generation system 146 may generally include a model generation rule set 170 for generation of the prediction model 160. The rule set 170 may include one or more parameters 162. Each set of parameters 162 may be combined using one or more mathematical functions to obtain a parameter function. Further, one or more specific parameters may be weighted by the weights 164. In some cases, the parameter function may be obtained by combining a set of parameters with a respective set of weights 164. The prediction model 160 and/or the respective parameters 162 of the prediction models 160 may be derived during a training process based on particular input data, such as the historical data 152, feedback data 154, and control data 156, as well as defined output criteria, which may be included with the control data 156, used for training purposes. The model generation rule set 170 can define the specific machine learning rules and/or algorithms the model generation system 146 uses to generate the model based on a defined objective function, such as determining a churn rate. In some embodiments, initial parameters 162 and weights 164 can be manually provided during the initiation of the model generation process. The parameters 162 and weights 164 can be updated and modified during the model generation phase to generate the prediction model 160.

The model generation system 146 can filter and categorize the historical data sets according to various characteristics and parameters of the data. For example, the data can be categorized by the data source (such as, for example, game application data, host application data, or user profile data), information type (such as, for example, gameplay information, transaction information, interaction information, or game account information), opponent data (such as, for example, skill of opponent, role selected or played by opponent, or success rate verse opponent), teammate data (such as, for example, skill of teammates, roles selected or played by teammates, or success rate when playing with a particular teammate), or other categories associated with the data. The model generation system 146 can filter the information to identify the information for further processing. In some embodiments, the model generation system 146 is configured to filter and separate the historical data 152 into a plurality of data types or categories before further processing. Moreover, in some cases, some of the historical data 152 may be filtered out or removed from the historical data 152 based on the data being associated with a relevance that does not satisfy a threshold relevance as determined by the model generation system 146.

Optionally, one or more of the prediction models 160 may be associated with a penalty 166. These penalties 166 may be used to facilitate the generation of or selection of a particular prediction model 160 based on one or more factors that are used to derive the penalty. For example, the mathematical complexity or the number of parameters included in a particular prediction model 160 may be used to generate a penalty for the particular prediction model 160, which may impact the generation of the model and/or a selection algorithm or a selection probability that the particular prediction model 160 is selected.

After the prediction model 160 has been generated, the model can be used during runtime of the retention analysis system 140 and/or the user matching system 132 to approve, reject, or select a match plan for playing an instance of the video game 112. In some cases, the prediction model 160 may be used to facilitate generating the match plan. In other cases, the prediction model 160 may be use to confirm whether a particular match plan satisfies a set of conditions, such as, for example, a particular threshold retention rate.

Example Retention Analysis System

Figure 1C:
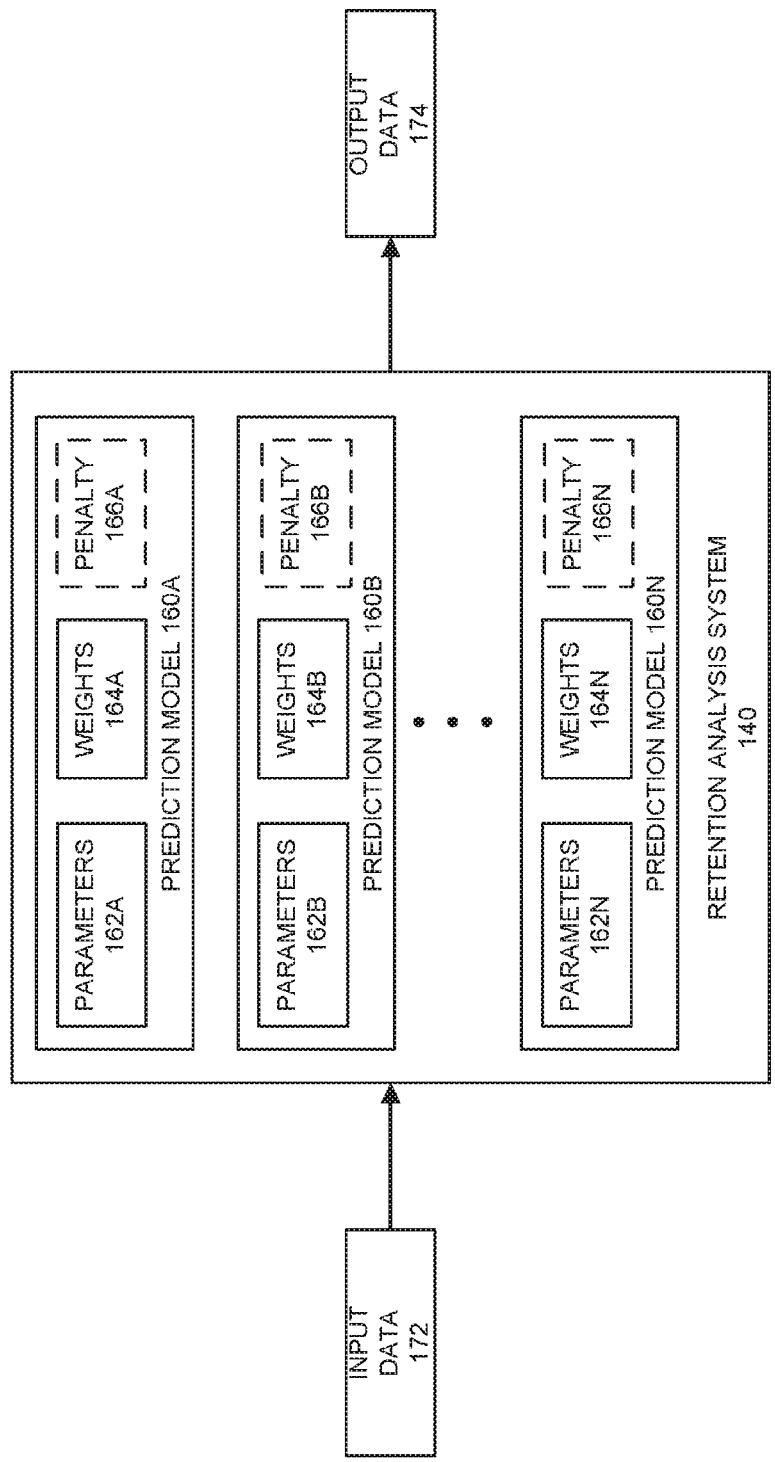
FIG. 1C illustrates an embodiment of a retention analysis system of FIG. 1A.

FIG. 1C illustrates an embodiment of a retention analysis system 140 of FIG. 1A. The retention analysis system 140 can apply or use one or more of the prediction models 160 generated by the model generation system 146. Although illustrated as a separate system, in some cases, the retention analysis system 140 may be included as part of the user matching system 132. The retention analysis system 140 may use one or more prediction models 160A, 160B, 160N (which may be referred to collectively as "prediction models 160" or in the singular as "prediction model 160") to process the input data 172 to obtain the output data 174.

The retention analysis system 140 may apply the prediction model(s) 160 during initiation of game play or a match for a particular instance of the video game 112. In some embodiments, the prediction models 160 are applied at the beginning of the game to generate a match plan or to confirm that the match plan satisfies a particular condition, such as, for example, retention rate or likelihood that the users spend a particular amount of in-game or real-world currency (for example, US dollars or Euros). In other embodiments, the prediction models 160 are applied at different times during the game and/or at different stages in the game. During initiation of an instance of the video game 112 or during selection of a set of users to be teammates and/or opponents, the retention analysis system 140 receives input data 172 that can be applied to one or more of the prediction models 160. The input data 172 can include one or more pieces of data associated with a user who is playing the video game 112 or has indicated a desire to play an instance of the video game 112. This data may include user interaction data for the video game 112, profile data for the user, and any other data that may be applied to the prediction model 160 to determine a retention or churn rate for the user. Further, the input data 172 can include one or more pieces of data associated with one or more additional users who may be selected as opponents and/or teammates of the user. The data associated with the additional users may include the same type of data as received for the user, a subset of the type of data received for the user, and/or additional types of data than that received for the user. In some embodiments, the input data 172 can be filtered before it is provided to the retention analysis system 140.

In some embodiments, a single prediction model 160 may exist for the retention analysis system 140. However, as illustrated, it is possible for the retention analysis system 140 to include multiple prediction models 160. The retention analysis system 140 can determine which prediction model, such as any of models 160A-N, to use based on input data 172 and/or additional identifiers associated with the input data 172. Additionally, the prediction model 160 selected may be selected based on the specific data provided as input data 172. The availability of particular types of data as part of the input data 172 can affect the selection of the prediction model 160. For example, the inclusion of demographic data (for example, age, gender, first language, or preferred language) as part of the input data may result in the use of prediction model 160A. However, if demographic data is not available for a particular user, then prediction model 160B may be used instead.

As mentioned above, one or more of the prediction models 160 may have been generated with or may be associated with a penalty 166. The penalty may be used to impact the generation of the model or the selection of a prediction model for use by the retention analysis system 140.

The output data 174 can be a retention rate or churn rate associated with a prediction that a user, or a set of users, ceases to play the video game 112. For example, in some embodiments, the retention rate may be between 0 and 100 indicating the predicted percentage of users associated with similar or the same data as included as input data 172 who would cease to play the video game 112 within a threshold time period. In some cases, the output data 174 may also identify a reason for the retention rate. For example, the retention analysis system 140 may indicate that the 90% retention rate for a particular user is based at least in part on the amount of money spent while playing the video game 112. However, the retention analysis system 140 may indicate that the 90% retention rate for another user may be based at least in part on the below freezing temperature in the geographic region where the user is located. As another example, the retention analysis system 140 may indicate that the 20% retention rate for a user may be based at least in part on the below 25% win ratio. In yet another example, the retention analysis system 140 may indicate that the 25% retention rate for a user may be based at least in part on the skill level of the user's teammates and/or opponents in a match plan not satisfying a skill level threshold.

The prediction models 160A, 160B, 160N may generally include a set of one or more parameters 162A, 162B, 162N, respectively (which may be referred to collectively as "parameters 162"). Each set of parameters 162 (such as parameters 162A) may be combined using one or more mathematical functions to obtain a parameter function. Further, one or more specific parameters from the parameters 162A, 162B, 162N may be weighted by the weights 164A, 164B, 164N (which may be referred to collectively as "weights 164"). In some cases, the parameter function may be obtained by combining a set of parameters (such as the parameters 162A) with a respective set of weights 164 (such as the weights 164A). Optionally, one or more of the prediction models 160A, 160B, 160N may be associated with a penalty 166A, 166B, 166N, respectively (which may be referred to collectively as "penalties 166"). It is recognized that the parameters 162 and/or the weights 164 used within the prediction model 160 may be different from (in part or in whole) the parameters 162 and/or the weights 164 used in the rule set 170 to generate or build the prediction model, and in some embodiments, the parameters and weights of the rule set for generating the model are different from the parameters and weights used within the model.

Example Prediction Model Generation Process

Figure 2:
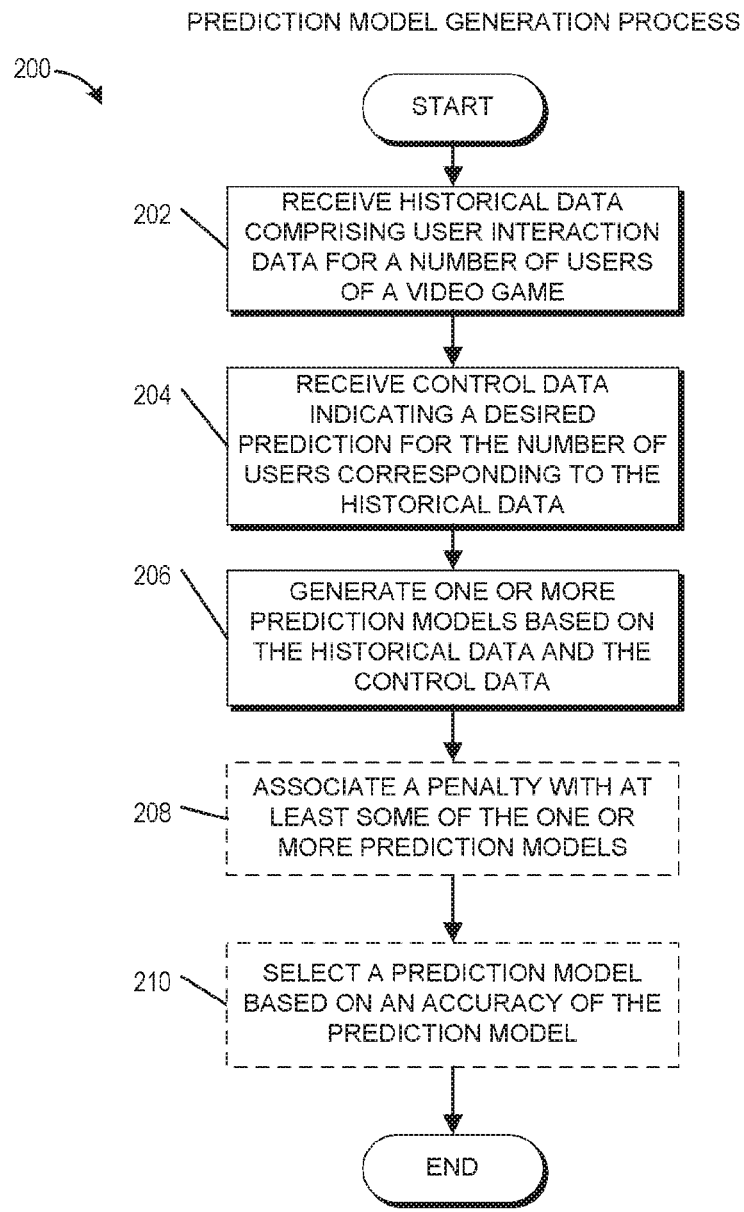
FIG. 2 presents a flowchart of an embodiment of a prediction model generation process.

FIG. 2 presents a flowchart of an embodiment of a prediction model generation process 200. The process 200 can be implemented by any system that can generate one or more parameter functions or prediction models that include one or more parameters. In some cases, the process 200 serves as a training process for developing one or more parameter functions or prediction models based on historical data or other known data. The process 200, in whole or in part, can be implemented by, for example, an interactive computing system 130, a user matching system 132, a skill evaluation system 136, a retention analysis system 140, a model generation system 146, or a user computing system 110, among others. Although any number of systems, in whole or in part, can implement the process 200, to simplify discussion, the process 200 will be described with respect to particular systems. Further, it should be understood that the process 200 may be updated or performed repeatedly over time. For example, the process 200 may be repeated once per month, with the addition or release of a new video game, or with the addition of a threshold number of new users available for analysis or playing a video game 112. However, the process 200 may be performed more or less frequently.

The process 200 begins at block 202 where the model generation system 146 receives historical data 152 comprising user interaction data for a number of users of the video game 112. This historical data 152 may serve as training data for the model generation system 146 and may include user demographics or characteristics, such as age, geographic location, gender, or socioeconomic class. Alternatively, or in addition, the historical data 152 may include information relating to a play style of one or more users; the amount of money spent playing the video game 112; user success or failure information with respect to the video game 112 (for example, a user win ratio); a play frequency of playing the video game 112; a frequency of using particular optional game elements (for example, available boosts, level skips, in-game hints, power ups, and the like); the amount of real money (for example, U.S. dollars or European euros) spent purchasing in-game items for the video game 112; or the like. In addition, the historical data 152 may include data relating to one or more other users who played the video game 112 with a user from the number of users. In some cases, the historical data 152 may comprise user interaction data and other user or video game related data for multiple sets of users where each set includes a group of users that play a multiplayer instance of a video game together as opponents, teammates, or both. The user or video game data may include not only the above-mentioned data, but also skill information for each user with respect to the video game 112 and/or one or more actions that can be performed in the video game 112 and/or one or more elements (such as levels or obstacles) of the video game 112. In addition, the data may include in-game character selection preferences, role preferences, and other information that can be used to distinguish play styles, preferences, or skills of different users.

At block 204, the model generation system 146 receives control data 156 indicating a desired prediction criteria corresponding to the historical data 152. This control data 156 may indicate one or more features or characteristics for which the model generation system 146 is to determine a model. Alternatively, or in addition, the control data 156 may include a value for the features or characteristics that are associated with the received historical data 152. In some embodiments, the control data 156 may include multiple characteristics or features to be predicted by the model to be generated by the model generation system 146. For example, the control data 156 may be a request to predict the likelihood that a user continues to play the videogame for a particular period of time after playing an instance of the video game with a type of paired user. As another example, the control data 150 may include likelihood that a user, if paired with another user as a teammate or opponent, will complete a game within 2 hours or play continuously for at least 2 hours. The control data 156 may designate criteria to use to determine churn rate, or retention rate, as the desired feature to be predicted by the model that is to be generated by the model generation system 146. The criteria may identify churn rate of an individual and/or churn rate of an individual as to another player type (for example, opponent or teammate). The churn rate or retention rate may correspond to a percentage of users associated with the historical data 152 that ceased playing the video game 112. Further, the control data 156 may identify criteria for determining a retention rate associated with the historical data. For example, the control data 156 may be used to identify, for the users whose data was provided as the historical data 152, both a retention rate and a reason for the retention rate (such as the skill level of the opponents diverging by more than a threshold skill delta, or a higher than threshold percentage of the teammates and/or opponents quitting an instance of the video game 112 before the match is completed), or a retention rate and an average monetary amount spent by the users whose data was provided as the historical data 152.

At block 206, the model generation system 146 generates one or more prediction models 160 based on the historical data 152 and the control data 156. The prediction models 160 may include one or more variables or parameters 162 that can be combined using a mathematical algorithm or model generation ruleset 170 to generate a prediction model 160 based on the historical data 152 and, in some cases, the control data 156. Further, in certain embodiments, the block 206 may include applying one or more feedback data 154. For example, if the prediction model 160 is generated as part of a supervised machine learning process, a system user (for example, an administrator) may provide one or more inputs to the model generation system 146 as the prediction model 160 is being generated and/or to refine the prediction model 160 generation process. For example, the user may be aware that a particular region or geographic area had a power outage. In such a case, the system user may supply feedback data 154 to reduce the weight of a portion of the historical data 152 that may correspond to users from the affected geographic region during the power outage. Further, in some cases, one or more of the variables or parameters may be weighted using, for example, weights 164. The value of the weight for a variable may be based at least in part on the impact the variable has in generating the prediction model 160 that satisfies, or satisfies within a threshold discrepancy, the control data 156 and/or the historical data 152. In some cases, the combination of the variables and weights may be used to generate a prediction model 160.

Optionally, at block 208, the model generation system 146 applies a penalty to or associates a penalty 166 with at least some of the one or more prediction models 160 generated at block 206 or with one or more of the variables used when generating the prediction models. The penalty associated with each of the one or more prediction models 160 may differ. Further, the penalty for each of the prediction models 160 may be based at least in part on the model type of the prediction model 160 and/or the mathematical algorithm used to combine the parameters 162 of the prediction model 160, and the number of parameters included in the parameter function. For example, when generating a prediction model 160, a penalty may be applied that disfavors a very large number of variables or a greater amount of processing power to apply the model. As another example, a prediction model 160 that uses more parameters or variables than another prediction model may be associated with a greater penalty 166 than the prediction model that uses fewer variables. As a further example, a prediction model that uses a model type or a mathematical algorithm that requires a greater amount of processing power to calculate than another prediction model may be associated with a greater penalty than the prediction model that uses a model type or a mathematical algorithm that requires a lower amount of processing power to calculate.

The model generation system 146, at block 210, based at least in part on an accuracy of the prediction model 160 and any associated penalty selects a prediction model 160. In some embodiments, the model generation system 146 selects a prediction model 160 associated with a lower penalty compared to another prediction model 160. However, in some embodiments, the model generation system 146 may select a prediction model associated with a higher penalty if, for example, the output of the prediction model 160 is a threshold degree more accurate than the prediction model associated with the lower penalty. In certain embodiments, the block 210 may be optional or omitted. For example, in some cases, the prediction models 160 may not be associated with a penalty and/or consideration of the penalty was done while generating the model. In some such cases, a prediction model may be selected from a plurality of prediction models based on the accuracy of the output generated by the prediction model or may be selected at random. In other cases, the result of performing the block 206 is a single prediction model making the operations associated with the blocks 208 and 210 unnecessary.

Example Matchmaking Objective

Figure 3:
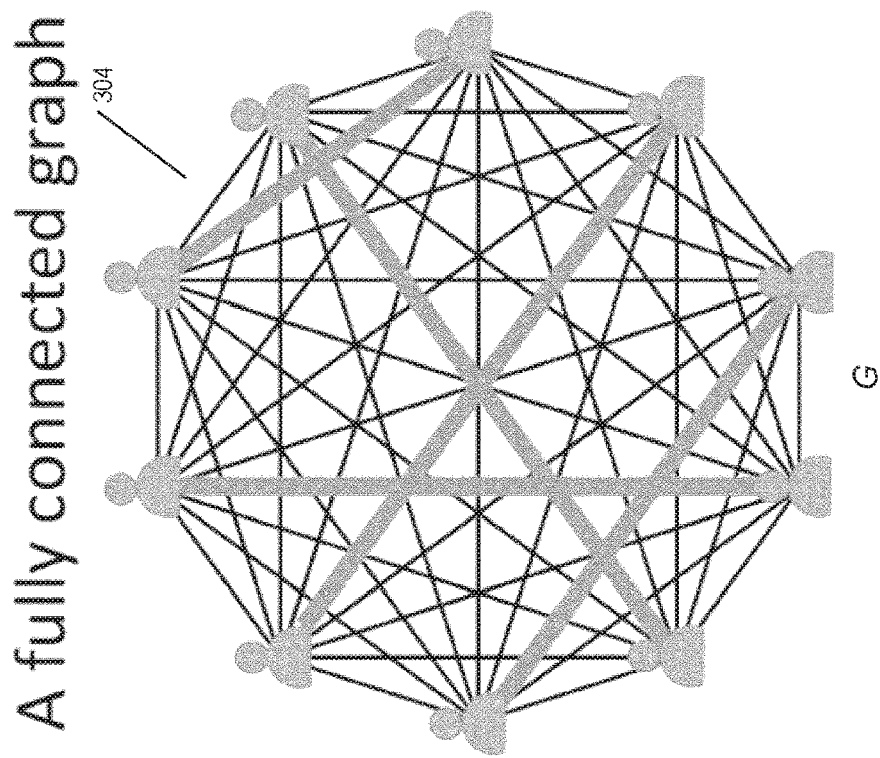
FIG. 3 presents an example of an embodiment of a connected graph of users.
Figure 3:
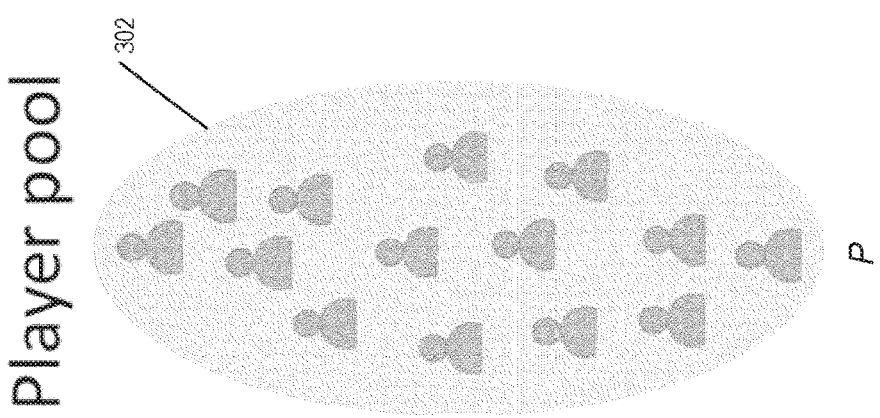

In embodiments described herein, matchmaking may be applied to a pool of users or players, $P=\{p_1, \ldots, p_N\}$, who are waiting to start or play 1-vs-1 matches. One such example of a pool of users P is illustrated in FIG. 3 as the pool of users 302. For simplicity, the 1-vs-1 use case is described. However, it should be understood that embodiments herein can be expanded to include more users for a multiplayer match. A graph G can be constructed to model the set of players waiting to play the multiplayer video game. One such example of the graph G is illustrated in FIG. 3 as the graph 304. Each player $p_i$ may be represented by a vertex or a node of the graph, which has a current player state $s_i$. The player state $s_i$ may represent any data specific to the user and the user's interaction with the video game 112.

For example, the player state $s_i$ may represent the user interaction data, the user's win-loss record, or user demographic data. Further, the player state data used may vary depending on the desired objective function, such as churn risk or likelihood to purchase in-game currency. The edge between two players $p_i$ and $p_j$ may be associated with the expected sum objective or engagement metric (for example, sum churn risk) if the users are paired. This metric relies on both users' states and may be denoted as a function $f(s_i, s_j)$. Note that G is typically a complete graph in that all pairs of players can be connected. However, a pre-computation and pre-filtering process may be performed to reduce the graph. A list of user or player tuples, $M=\{(p_i, p_j)\}$, may be used to denote a matchmaking result, or a pair assignment, in which all players in P are paired and are only paired once. The graph 304 in FIG. 3, illustrative of the graph G, represents a graphical pairing of ten of the users from the pool 302, illustrative of the pool P. However, in some cases, the graph G may be formed to represent all players in the player pool P.

Embodiments described herein attempt to find an optimal pair assignment M*, which maximizes the overall player engagement:

$$M^* = \mathrm{argmax}_M \Sigma_{(p_i, p_j) \in M} f(s_i, s_j) \qquad (1)$$

Churn risk can be used as a concrete disengagement metric. Churn risk can indicate the likelihood of a player playing zero games within a particular period of time or after a match played with the selected match plan. Maximizing the sum engagement of two players can be considered equivalent to minimizing the sum churn risks of the two players or users. The churn risk $c_{i,j}$ of a player $p_i$ after being matched in an instance of the video game with player $p_j$ can be modeled as a function of both users or players' states, $c_{i,j} = c(s_i, s_j)$. Note that typically $c_{i,j} \ne c_{j,i}$ as two players in a paired match may be impacted differently by being paired together. For example, one player may enjoy the matchup while the other player may not enjoy the matchup because each player may have different matchup preferences. Thus, using churn risk as the objective function and taking into account that each player's churn risk in a pairing may be affected differently by the pairing, the optimization objective function of equation 1 may be converted to:

$$M^* = \mathrm{argmin}_M \Sigma_{(p_i, p_j) \in M} c(s_i, s_j) + c(s_j, s_i) \qquad (2)$$

Assigning $c_{i,j} + c_{j,i}$ as weights to the edge of G, the optimization equation 2 can be converted to a minimum weight perfect matching (MWPM) problem. Solving the MWPM problem with respect to the graph G results in finding a pair assignment for the users P with the minimal sum weights of edges.

Prediction of Churn Risk

The function $c_{i,j} = c(s_i, s_j)$ may be modeled as a churn prediction problem. The churn risk $c_{i,j}$ of player $p_i$ may depend on the features from both the player himself and his or her opponent. However, using the player state information, or user interaction information, of both users as input to the function $c_{i,j}$, which may be modeled as a parameter function of prediction model obtained using a machine learning process, will double the feature dimensions of the function, which can make the resultant prediction unintelligible or harder to determine because, for example, generating the parameter function using a machine learning algorithm may require significantly more training data compared to a function determined for a single user's player state information.

Thus, embodiments disclosed herein rely on a single user, $p_i$'s, state information, $s_i$, to predict $c_{i,j}$. But the state information $s_j$ of the user's opponent may influence the state information $s_i$ of the user. For example, in the context of matchmaking, the predicted match outcome of an instance of a video game between the user $p_i$ and the opponent $p_j$ may be used to influence the determination of $c_{i,j}$. Thus, once the game outcome is known, $c_{i,j}$ may become conditionally independent on the opponent's state $s_j$.

In one example use case, assume game outcomes are sampled from a finite set O, such as Win, Lose and Draw. Using a standard skill model, a game outcome based on two users' skills can be predicted. In some cases, this prediction can be regardless of other features of the users' states. Denoting player $p_i$'s skill representation (for example, via a vector) as $\mu_i$, the probability of the game outcome $o_{i,j}$ between player $p_i$ and $p_j$ (from the view of $p_i$) can be represented as:

$$Pr(o_{i,j}|s_i,s_j) = Pr(o_{i,j}|\mu_i\mu_j) \quad (3)$$

where $o_{i,j}=W$ means that $p_i$ wins and $p_j$ loses, and where $o_{i,j}=L$ represents the same outcome from the view of $p_j$.

The churn risk of paired users can be efficiently predicted based on equation 2 as follows:

$$c(s_i, s_j) + c(s_j, s_i) \quad (4)$$

$$= \sum_{o_{i,j} \in O} Pr(o_{i,j}|s_i,s_j)(c(s_i, s_j|o_{i,j}) + c(s_j, s_i|o_{j,i})) \quad (5)$$

$$= \sum_{o_{i,j} \in O} Pr(o_{i,j}|\mu_i\mu_j)(c(s_i|o_{i,j}) + c(s_j|o_{j,i})) \quad (6)$$

where the first equality is a marginalization on game outcome $o_{i,j}$. In the second equality, equation 3 is plugged in. The construct $c(s_i|o_{i,j})$ may represent the churn risk of player pi after matchmaking, where the conditional independence of $c_{i,j}$ on $s_j$ given $o_{i,j}$ is used.

The construct $c(s_i|o_{i,j})$ can be efficiently learned as a churn prediction problem. The input features may include an updated user state after determining the matchmaking video game outcome, $s_i^{update} \leftarrow s_i + o_{i,j}$. Decomposing $s_i=[o_i^K, \hat{s}_i]$, where $o_i^K$ a vector of the latest K video game outcomes (for example, $o_i^K$=LWLDL when K=5), and $s_i$ represents the other state information in $s_i$. The state update can be represented as:

$$s_i^{update} \leftarrow s_i + o_{i,j} \quad (7)$$

$$= [o_i^K, \hat{s}_i] + o_{i,j} \quad (8)$$

$$= [o_i^{K+1}, \hat{s}_i^{update}] \quad (9)$$

with s $i^{update}$ indicating that non-game-outcome state information or features may also be updated after a new match is completed. For example, the total number of games played increments by 1. Embodiments herein are amenable to adopting other churn prediction models based on the updated user state information.

Once a graph of the users is generated and the weights are applied to the edges based on the selected objective function, such as churn risk, an optical pair assignment can be determined using an edge selection algorithm. For example, solving a minimum weight perfect matching (MWPM) problem can be used to select the edges that result in user pairs being selected that are associated with the lowest churn risk. The process 400 described with respect to FIG. 4 below provides additional details regarding the selection of users for a match plan using the increased engagement or churn risk reduction process.

Example Multiplayer Matching Process

Figure 4:
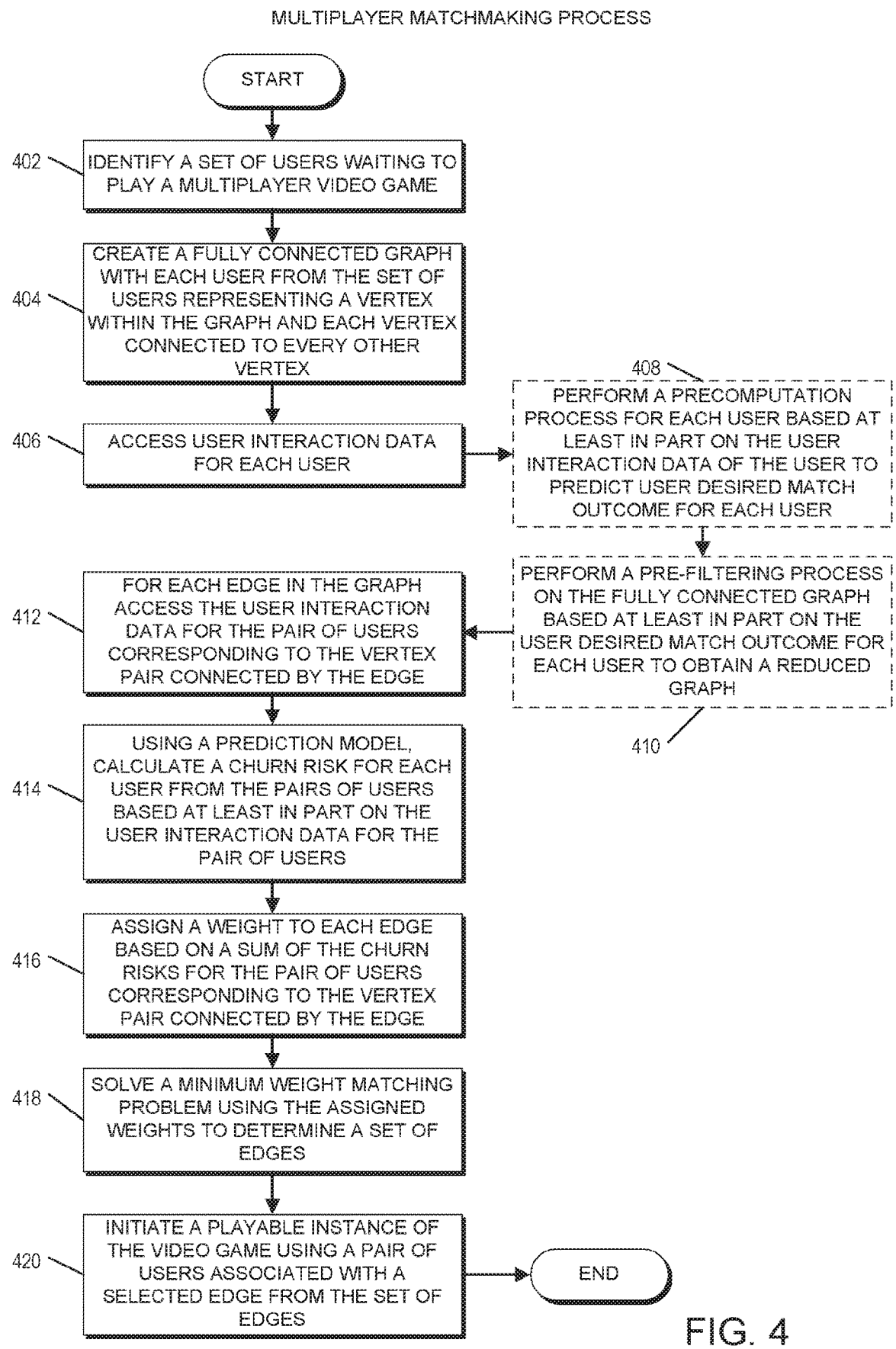
FIG. 4 presents a flowchart of an embodiment of a multiplayer matching process.

FIG. 4 presents a flowchart of an embodiment of a multiplayer matching process 400. The process 400 can be implemented by any system that can create a match plan of two or more users that may play the video game 112 as opponents, teammates, or a combination of the two. The process 400, in whole or in part, can be implemented by, for example, an interactive computing system 130, a user matching system 132, a user graph generator 120, a skill evaluation system 136, a retention analysis system 140, a model generation system 146, or a user computing system 110, among others. Although any number of systems, in whole or in part, can implement the process 400, to simplify discussion, the process 400 will be described with respect to particular systems. Further, it should be understood that the process 400 may be updated or performed repeatedly over time. For example, the process 400 may be repeated for each play session of a video game 112 or for each round of the video game 112. However, the process 400 may be performed more or less frequently.

The process 400 begins at block 402 where the user matching system 132 identifies a set of users waiting to play a multiplayer video game 112. The identified set of users or pool of players include users that may potentially be paired or included in a match plan of two or more users as teammates, opponents, or a combination of the two. The user matching system 132 may use any type of system or process for identifying users to potentially be matched together. For example, the user matching system 132 may identify users based on their position or length of time in a queue of users waiting to play an instance of the video game 112. Alternatively, the user matching system 132 may identify the users based on a skill level. In another example, the user matching system 132 may select users at random within a certain time window. This time window may be related to the length of time that a set of users have been waiting in a queue of users. Moreover, the time window may vary based on the number of users in the queue of users. Further, in some cases, at least some of the number of users may be selected based on an indication that the at least some of the number of users have indicated a desire to play the video game 112 together.

At block 404, the user graph generator creates a fully connected graph, G, to model the users with each user from the set of users identified at the block 402 representing a vertex or node within the graph and with each vertex connected by an edge to each other vertex within the graph. FIG. 3 presents an example of the graph generation process. FIG. 3 includes a pool of users 302. In the illustrated example, the pool of users 302 includes 14 users. Further, in the illustrated example of FIG. 3, 10 users may be selected from the pool of users 302 as part of the operations performed at the block 402 of the process 400.

As part of the operations performed at the block 404, a graph 304 may be generated with each vertex of the graph representing one of the 10 users selected at the block 402. As illustrated in FIG. 3, the graph 304 is a fully connected graph with each vertex of the graph connected to each other vertex of the graph. In other words, in the illustrated example, each vertex is connected to nine other vertexes in the graph 304.

Returning to FIG. 4, at block 406, the retention analysis system 140 accesses user interaction data for each of the users identified at the block 402. The user interaction data may be accessed from a user data repository 142 may include information relating to each user's interaction with the video game 112. The user interaction data may include current user interaction data, historical user interaction data, or a combination of the two. The current user interaction data may include user interaction data from the current play session or user interaction data that is newer than a particular threshold time period. For example, the recent user interaction data may include user interaction data that is less than a week or a month old. Alternatively, or in addition, the recent user interaction data may include data from play sessions that are less than 3, 5, or 10 play sessions old. Conversely, the historical user interaction data may include user interaction data that is older than a particular threshold time period. For example, the historical user interaction data may include user interaction data that is at least a week or a month old. Alternatively, or in addition, the historical user interaction data may include data from play sessions that are more than 5 or 10 play sessions old.

The user interaction data may include any data relating to the user's interaction with the video game 112 including, for example, an identity of an in game character selected by the user; a role that the user plays a threshold percentage of times (such as a healer or a defender); an amount of time the user has spent playing the video game; an amount of money the user has spent with respect to the video game 112; a skill level associated with the user; and the like. Further, block 406 may include accessing data relating to opponents or teammates that the user has previously played with. In some cases, the user interaction data for a user may include opponent or teammate-dependent data. For example, the user interaction data for a user may indicate that the user typically (for example, more often than a threshold percentage) plays the video game 112 as a healer when the user's teammates are of a higher skill level than the user. However, user interaction data for the user may indicate that the user typically plays the video game 112 is a melee attack character when the user's teammates are of a lower skill level than the user.

In certain embodiments, particular values (such as default values) may be assigned to users who are not associated with user interaction data, or that are associated with user interaction data derived from less than a threshold number of matches or amount of playing with of the video game 112. Advantageously, in some such embodiments, the process 400 may be used with users that are new to playing the video game 112 or are associated with less than a threshold amount of matches or play time for the video game 112 by using the particular values for the user.

Optionally, at block 408, the user graph generator 120 performs a pre-computation process for each user based at least in part on the user interaction data of the user to predict a user desired match outcome for each user. Performing the pre-computation process may include using a parameter function or prediction model 160 to predict a user's desired match outcome based on the user interaction data of the user. This prediction model may be a different model than used in block 414. Determining the users desired match outcome may include determining whether the user desires to win or lose his or her next match of the videogame 112, or whether the user is indifferent to the outcome of the next match. For example, a user who has won several matches in a row may begin to feel the videogame 112 is too simple and may desire to lose the next match to maintain the feeling of a challenge. Another user may dislike losing and, despite having won several matches in a row, may desire to continue winning matches. A third user may have lost several matches in a row and may desire to win a match. If the third user does not win a match the video game 112 may appear too challenging to the third user. A fourth user may enjoy playing the videogame 112 regardless of the outcome.

At block 410, the user graph generator 120 performs a pre-filtering process on the fully connected graph created at the block 404 based at least in part on the user desired match outcome for each user determined at the block 408 to obtain a reduced graph. Performing the pre-filtering process may include removing edges between particular users within the previously fully connected graph. For example, if it is determined that one user has a desire to win the next match and one user has a desire to lose the next match, an edge connecting a pair of nodes representative of the two users as being potential teammates may be removed from the connected graph. Advantageously, in certain embodiments, by performing the pre-filtering process to reduce the fully connected graph to a reduced graph, the amount of processing power required to perform operations related to subsequent blocks in the process 400 is reduced. For example, as will be described in more detail below, the block 418 includes solving a minimum weight matching problem to identify one or more match plans for playing the videogame 112. By performing the pre-filtering process to reduce the fully connected graph, operations associated with the block 418 may be performed more quickly and with less computational resources on the reduced connected graph obtained by the pre-filtering process compared to performing the operations on the fully connected graph. In certain embodiments, the block 410 is optional or omitted, such as when the block 408 is omitted.

At block 412, for each edge in the reduced graph, or the fully connected graph if the blocks 408 and 410 are omitted, the retention analysis system 140 accesses user interaction data for the pair of users corresponding to the vertex pair connected by the edge. Each edge may be representative of one versus one match plan. Thus, the edges in the graph the graph may be thought of as a plurality of potential one versus one match plans. While the process 400 is primarily described with respect to identifying pairs of users to play, for example, one versus one matches of the videogame 112, the process 400 is not limited as such. Embodiments of the process 400 may be used to create match plan that includes more than two users. For example, the process 400 may be used to select three or four users to include in a match plan. Thus, in some embodiments, the retention analysis system 140 accesses user interaction data for a set of users corresponding to the vertices connected by a set of edges included in a match plan. For example, suppose that a particular videogame 112 supports three users playing against three non-player characters (NPCs). In such cases, user interaction data may be selected for triangles of users within the fully connected or reduced graph.

Using a prediction model at block 414, the retention analysis system 140 calculates a churn risk for each user from each pair of users in the connected graph based at least in part on the user interaction data for the pair of users. The churn risk may include a probability that the user continues to play the videogame 112 for a particular period of time after playing an instance of the videogame 112 with the paired user. In some cases, determining the churn risk for each user includes applying the predicted outcome of a matchup between the pair of users and the user interaction data for a user to the prediction model. Alternatively, or in addition, determining the churn risk for each user includes applying the interaction data for the user and the interaction data for the paired user, or groups of users in the case of multiplayer matchups that include more than two users, to the prediction model.

As previously described, the user interaction data may include any type of data that relates to the user's interaction with the videogame 112 including the actions taken by the user while playing the videogame 112 and the users level of success are playing the videogame 112. In some cases, the user interaction data may include additional, or alternative data, relating to the user's preferences when playing the videogame 112. Moreover, the user interaction data available for one user may differ from the user interaction data available for another user. For example, a preferred character class may be known for one user and included in the user interaction data, but may not be known for another user and may therefore be omitted from the user interaction data for the other user. Furthermore, in some cases, the particular match plan detailing which players are teammates and which players are opponents may be provided to the prediction model 160 to determine the churn risk for each of the number of users. In some such cases, the prediction model 160 may output, in addition to or instead of the churn risk, a match plan or an alternative match plan that maximizes the retention rate for the set of users. In some cases, the user interaction data may include providing additional data indicating that two or more users that are to be grouped together as teammates or as opponents. For example, two players may indicate that they desire to play a match together. Thus, in some cases, the parameter function may adjust the outputted churn risk for the pair or group of users based on an indication that two or more of users has indicated a desire to play the match together.

At block 416, the user graph generator 120 assigns a weight to each edge of the graph based on a sum of the churn risks for the pair of users corresponding to the vertex pair connected by the edge, for example, the sum of the churn risk for player A being paired with player B and the churn risk for player B being paired with player A. In some cases, a pair of users may indicate a desire to play match together. In such cases, the weight assigned to an edge associated with the pair of users that have indicated a desire to play a match together may be adjusted to ensure that the edge is selected as part of the process associated with the block 418 described below. In cases where the number of users that have indicated a desire to play match together is less than the total number of users to play a match, nodes associated with the users are maintained within the graph for the purpose of selecting the additional users to play the match. For example, in a four player multiplayer videogame 112, if two users indicate a desire to play together nodes associated with the two users may be maintained within the graph and an edge between the two users may be weighted such that selection of the two users to play together as guaranteed. However, if the number of users who indicated a desire to play the multiplayer video game 112 together is equal to the number of users that may play a multiplayer videogame 112 together, nodes and edges associated with the users that have indicated a desire to play together may be removed from the graph. In other cases, users associated with particular nodes within the graph may be replaced with other users.

At block 418, the user matching system 132 solves a minimum weight matching (MWM) or a minimum weight perfect matching (MWPM) problem using the assigned weights to determine a set of edges. In cases where an MWM problem is solved, the selected edges may omit one or more of the nodes included in the graph. In such cases, users associated with omitted nodes may be included in another graph with alternative users in a subsequent performance of the process 400. In other words, in some cases, not all users identified in the block 402 may be assigned to an instance of the videogame 112. In these cases, the users may be placed back in a pool of users awaiting assignment to an instance of the videogame 112. In cases where an MWPM and problem is solved, each node in the graph will be associated with a selected edge.

As previously stated, embodiments disclosed herein may be applied to additional or alternative objectives and are not limited to the selection of users based on churn risk. For example, at block 414, a prediction model may be used to determine retention rate, currency spending rate, probability of positive or negative user behavior as determined, for example, by the video game developer or a video game community, or the probability a user completes a match alone or with respect to one more teammate types or opponent types. In some cases, it may be desirable to select edges associated with the highest weights rather than the lowest weights. In such cases, the block 418 may include solving a maximum weight matching or a maximum weight perfect matching problem.

In some embodiments, the block 418 also includes identifying users associated with vertices of the set of edges to play an instance of the videogame 112. In some cases, the pair of users associated with each edge are identified for playing a separate instance of the videogame 112. In other cases, three or more users connected by selected edges within the graph may be selected for playing an instance of the videogame 112. For example, in a three player multiplayer game, the block 418 may include solving the minimum weight matching problem for groups of three edges instead of individual edges. Users associated with each group, or triangle, of three edges may be selected to play an instance of the videogame 112. In other words, the process 400 may be modified from determining users to play an instance of the videogame based on a state of a user and the state of an opponent to a grouping problem that examines the predicted churn risk for three or more users selected to play the instance of the videogame 112 together.

The graph 404 of FIG. 4 illustrates the completion of the solving of the minimum weight matching problem as illustrated by the bolded or thicker lines that exist between pairs of users in the graph 404. In some embodiments, the selected edges may be filtered to remove edges that do not satisfy a particular threshold. For example, continuing the example illustrated in FIG. 4, solving the minimum weight matching problem may result in selecting the five edges with the lowest associated weights. However, some of the five edges may be associated with the weights that exceed a particular threshold. In some such cases the edges associated weights that exceed the particular threshold may be removed and the associated users may be included in a new graph with additional users from the pool of users 402.

At block 420, the user matching system 132 and initiates a playable instance of the video game 112 using a pair of users associated with a selected edge from the set of edges determined at the block 418. In some cases, the block 420 may include initiating a separate playable instance of the videogame 112 for each pair of users associated with each selected edge from the set of selected edges. Moreover, as described with respect to the block 418, more than two users may be selected to play an instance of the videogame 112. The grouping of three or more users may be selected based on the users' association with a selected group of edges from the set of edges.

In some embodiments, the block 420 may include determining whether the churn risk for each pair of users associated with each selected edge satisfies a threshold. For each pair of users associated with a churn risk that does satisfy the threshold, a playable instance of the videogame 112 may be initiated. Conversely, for each pair of users associated with a churn risk that does not satisfy the threshold, the pair of users may be placed back in a queue of users waiting to play an instance of the videogame 112.

In certain embodiments, at least some of the operations associated with at least some of the blocks of the process 400 may be performed in advance of a trigger to initiate an instance of the videogame 112. For example, operations associated with the blocks 402 through 416 may be performed during a first time period. During a second time period subsequent to the first time period, upon receiving a trigger to initiate one or more playable instances of the multiplayer video game 112, operations associated with the blocks 418 and 420 may be performed. Advantageously, by performing at least some of the operations in advance, the process of matching users for playing an instance of the videogame 112 may be accelerated. Further, portions of the process 400 may be repeated at a lower computational cost. For example, suppose the operations associated with the blocks 402 through 412 are performed during a first time period. Further, suppose that one or more users identified at the block 402 cease playing overseas waiting to play an instance of the multiplayer video game. In such cases, the operations associated with the blocks 402 through 412 may be repeated during the first time period before performing the subsequent blocks during a second time period. By separating the performance of certain blocks into different time periods, fewer operations may need to be repeated upon detecting a change in the available users, thereby improving the performance of the user selection process.

Overview of Computing System

Figure 5:
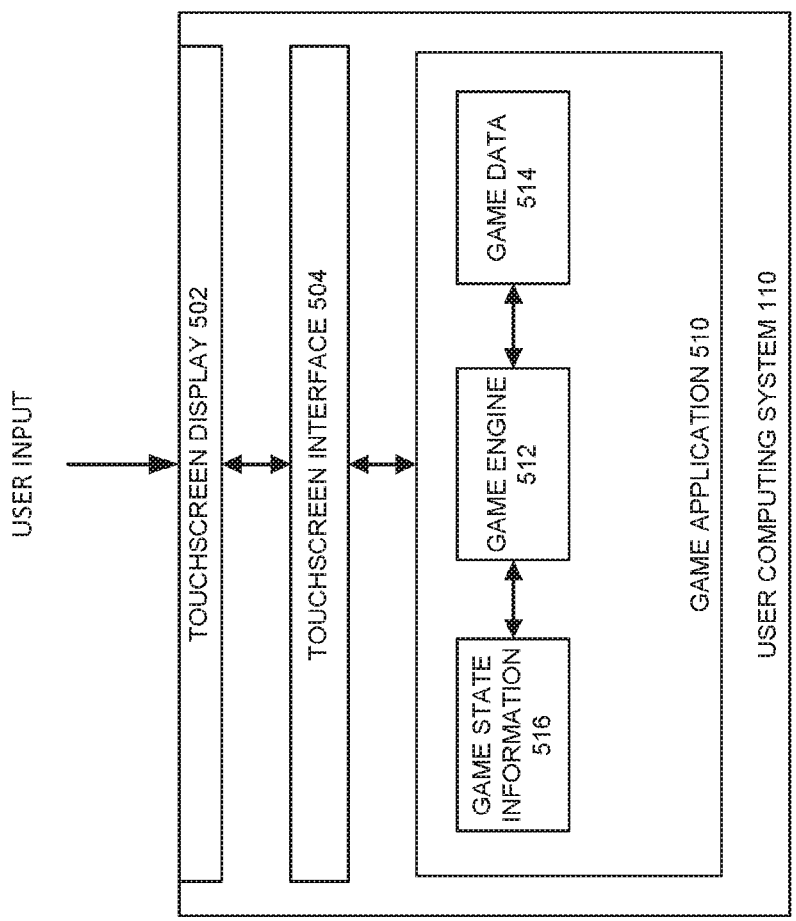
FIG. 5 illustrates an embodiment of a user computing system.

FIG. 5 illustrates an embodiment of a user computing system 110, which may also be referred to as a gaming system. Although FIG. 5 is specific to the user computing system 110, it should be understood that the user computing systems 114 and 116 may have the same or a similar configuration. Alternatively, one or more of the user computing systems 114 and 116 may have different configurations than each other and/or the user computing system 110. As illustrated, the user computing system 110 may be a single computing device that can include a number of elements. However, in some cases, the user computing system 110 may include multiple devices. For example, the user computing system 110 may include one device that includes a central processing unit and a graphics processing unit, another device that includes a display, and another device that includes an input mechanism, such as a keyboard or mouse.

The user computing system 110 can be an embodiment of a computing system that can execute a game system. In the non-limiting example of FIG. 5, the user computing system 110 is a touch-capable computing device capable of receiving input from a user via a touchscreen display 502. However, the user computing system 110 is not limited as such and may include non-touch capable embodiments, which do not include a touchscreen display 502.

The user computing system 110 includes a touchscreen display 502 and a touchscreen interface 504, and is configured to execute a game application. This game application may be the video game 112 or an application that executes in conjunction with or in support of the video game 112, such as a video game execution environment. Although described as a game application 112, in some embodiments the application 112 may be another type of application that may be capable of interacting with multiple users across multiple user computing systems, such as educational software or language software. While user computing system 110 includes the touchscreen display 502, it is recognized that a variety of input devices may be used in addition to or in place of the touchscreen display 502.

The user computing system 110 can include one or more processors, such as central processing units (CPUs), graphics processing units (GPUs), and accelerated processing units (APUs). Further, the user computing system 110 may include one or more data storage elements. In addition, the user computing system 110 may include one or more volatile memory elements, such as random-access memory (RAM). In some embodiments, the user computing system 110 can be a specialized computing device created for the purpose of executing game applications 112. For example, the user computing system 110 may be a video game console. The game applications 112 executed by the user computing system 110 may be created using a particular application programming interface (API) or compiled into a particular instruction set that may be specific to the user computing system 110. In some embodiments, the user computing system 110 may be a general purpose computing device capable of executing game applications 112 and non-game applications. For example, the user computing system 110 may be a laptop with an integrated touchscreen display or desktop computer with an external touchscreen display. Components of an example embodiment of a user computing system 110 are described in more detail with respect to FIG. 6.

The touchscreen display 502 can be a capacitive touchscreen, a resistive touchscreen, a surface acoustic wave touchscreen, or other type of touchscreen technology that is configured to receive tactile inputs, also referred to as touch inputs, from a user. For example, the touch inputs can be received via a finger touching the screen, multiple fingers touching the screen, a stylus, or other stimuli that can be used to register a touch input on the touchscreen display 502. The touchscreen interface 504 can be configured to translate the touch input into data and output the data such that it can be interpreted by components of the user computing system 110, such as an operating system and the game application 112. The touchscreen interface 504 can translate characteristics of the tactile touch input touch into touch input data. Some example characteristics of a touch input can include, shape, size, pressure, location, direction, momentum, duration, and/or other characteristics. The touchscreen interface 504 can be configured to determine the type of touch input, such as, for example a tap (for example, touch and release at a single location) or a swipe (for example, movement through a plurality of locations on touchscreen in a single touch input). The touchscreen interface 504 can be configured to detect and output touch input data associated with multiple touch inputs occurring simultaneously or substantially in parallel. In some cases, the simultaneous touch inputs may include instances where a user maintains a first touch on the touchscreen display 502 while subsequently performing a second touch on the touchscreen display 502. The touchscreen interface 504 can be configured to detect movement of the touch inputs. The touch input data can be transmitted to components of the user computing system 110 for processing. For example, the touch input data can be transmitted directly to the game application 112 for processing.

In some embodiments, the touch input data can undergo processing and/or filtering by the touchscreen interface 504, an operating system, or other components prior to being output to the game application 112. As one example, raw touch input data can be captured from a touch input. The raw data can be filtered to remove background noise, pressure values associated with the input can be measured, and location coordinates associated with the touch input can be calculated. The type of touch input data provided to the game application 112 can be dependent upon the specific implementation of the touchscreen interface 504 and the particular API associated with the touchscreen interface 504. In some embodiments, the touch input data can include location coordinates of the touch input. The touch signal data can be output at a defined frequency. Processing the touch inputs can be computed many times per second and the touch input data can be output to the game application for further processing.

A game application 112 can be configured to be executed on the user computing system 110. The game application 112 may also be referred to as a video game, a game, game code and/or a game program. A game application should be understood to include software code that a user computing system 110 can use to provide a game for a user to play. A game application 112 might comprise software code that informs a user computing system 110 of processor instructions to execute, but might also include data used in the playing of the game, such as data relating to constants, images and other data structures. For example, in the illustrated embodiment, the game application includes a game engine 512, game data 514, and game state information 516. As previously stated, the embodiments described herein may be used for applications other than video games, such as educational software or videoconferencing. Thus, in some such cases, the game application 112 may be substituted with other types of applications that may involve multiple users communicating over a network and selecting a server, or one of the plurality of user computing systems, to act as a host.

The touchscreen interface 504 or another component of the user computing system 110, such as the operating system, can provide user input, such as touch inputs, to the game application 112. In some embodiments, the user computing system 110 may include alternative or additional user input devices, such as a mouse, a keyboard, a camera, a game controller, and the like. Further, the user computing system 110 may include a virtual reality display and/or an augmented reality display. A user can interact with the game application 112 via the touchscreen interface 504 and/or one or more of the alternative or additional user input devices. The game engine 512 can be configured to execute aspects of the operation of the game application 112 within the user computing system 110. Execution of aspects of gameplay within a game application can be based, at least in part, on the user input received, the game data 514, and game state information 516. The game data 514 can include game rules, prerecorded motion capture poses/paths, environmental settings, constraints, animation reference curves, skeleton models, and/or other game application information. Further, the game data 514 may include information that is used to set or adjust the difficulty of the game application 112.

The game engine 512 can execute gameplay within the game according to the game rules. Some examples of game rules can include rules for scoring, possible inputs, actions/events, movement in response to inputs, and the like. Other components can control what inputs are accepted and how the game progresses, and other aspects of gameplay. During execution of the game application 112, the game application 112 can store game state information 516, which can include character states, environment states, scene object storage, and/or other information associated with a state of execution of the game application 112. For example, the game state information 516 can identify the state of the game application at a specific point in time, such as a character position, character action, game level attributes, and other information contributing to a state of the game application.

The game engine 512 can receive the user inputs and determine in-game events, such as actions, collisions, runs, throws, attacks and other events appropriate for the game application 112. During operation, the game engine 512 can read in game data 514 and game state information 516 in order to determine the appropriate in-game events. In one example, after the game engine 512 determines the character events, the character events can be conveyed to a movement engine that can determine the appropriate motions the characters should make in response to the events and passes those motions on to an animation engine. The animation engine can determine new poses for the characters and provide the new poses to a skinning and rendering engine. The skinning and rendering engine, in turn, can provide character images to an object combiner in order to combine animate, inanimate, and background objects into a full scene. The full scene can be conveyed to a renderer, which can generate a new frame for display to the user. The process can be repeated for rendering each frame during execution of the game application. Though the process has been described in the context of a character, the process can be applied to any process for processing events and rendering the output for display to a user.

In some cases, at least some of the videogame engine 512 may reside on a server, such as one of the videogame servers 152. Further, in some cases, the complete videogame engine 512 may reside on the server. Thus, in some cases, the videogame engine 512 may be omitted from the portion of the videogame application 112 hosted on the user computing system 110. Similarly, in some embodiments, videogame state information 516 and videogame data 514 may be hosted on a server in addition to or instead of on the user computing system 110. Further, in some cases, actions of the user performed within the video game application 112 may be transmitted to a server that is hosting a portion of the videogame 112. The server may compute or determine the result of the user's interaction with respect to the videogame application 112, such as collisions, attacks, or movements. The server may then send a result of the user's actions to the videogame application 112 on the user computing system 110. The videogame application 112 may then perform an action in response to the result, such as displaying the result to the user.

Example Hardware Configuration of Computing System

Figure 6:
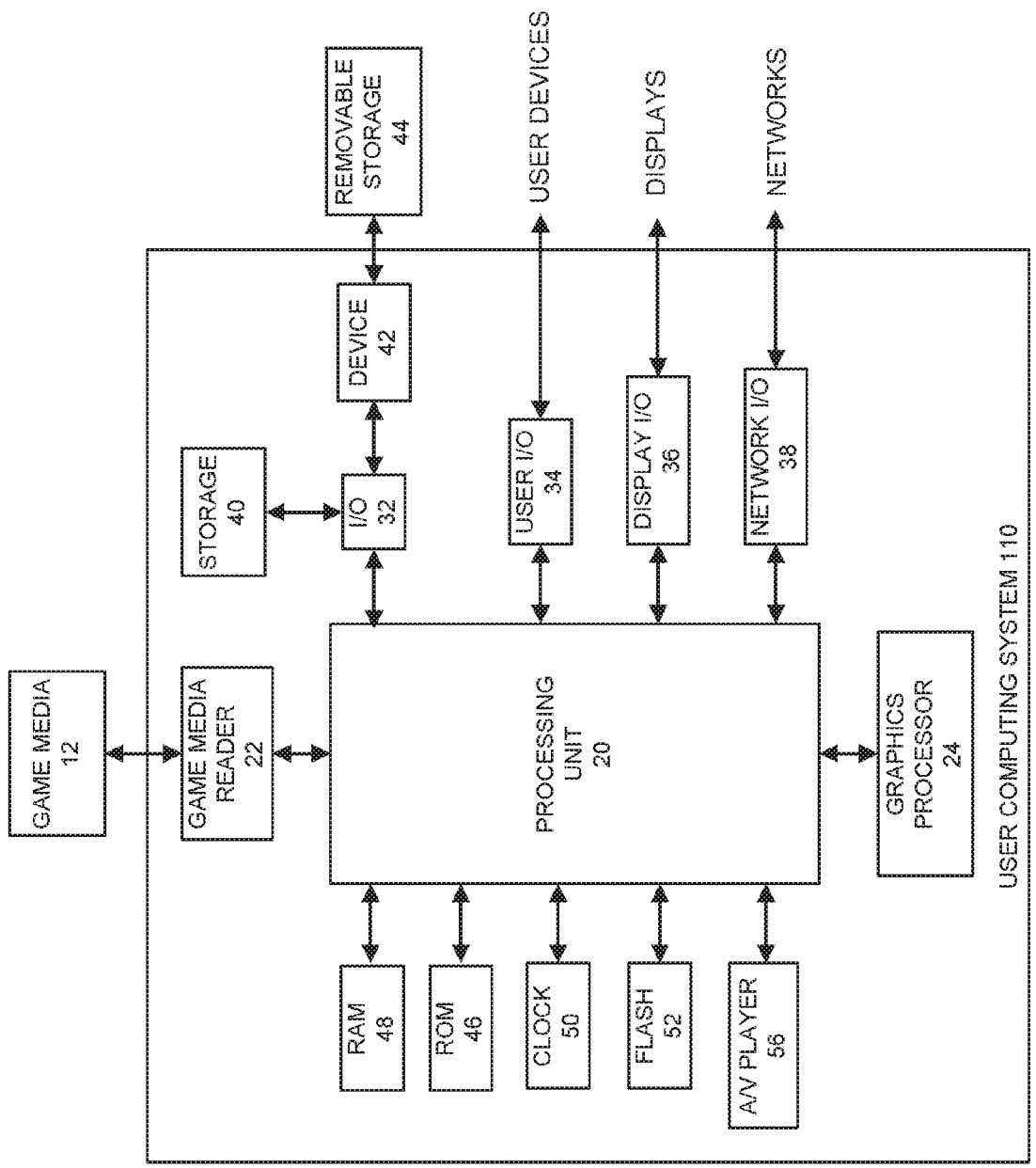
FIG. 6 illustrates an embodiment of a hardware configuration for the user computing system of FIG. 5.

FIG. 6 illustrates an embodiment of a hardware configuration for the user computing system 110 of FIG. 5. It should be understood that each of the user computing systems 114 and 116 may be configured similarly or the same as the user computing system 110. Alternatively, one or more of the user computing systems 114 and 116 may have different configurations than each other and/or the user computing system 110. Other variations of the user computing system 110 may be substituted for the examples explicitly presented herein, such as removing or adding components to the user computing system 110. The user computing system 110 may include a dedicated game device, a smart phone, a tablet, a personal computer, a desktop, a laptop, a smart television, a car console display, and the like. Further, (although not explicitly illustrated in FIG. 6) as described with respect to FIG. 5, the user computing system 110 may optionally include a touchscreen display 502 and a touchscreen interface 504.

As shown, the user computing system 110 includes a processing unit 20 that interacts with other components of the user computing system 110 and also components external to the user computing system 110. A game media reader 22 may be included that can communicate with game media 12. Game media reader 22 may be an optical disc reader capable of reading optical discs, such as CD-ROM or DVDs, or any other type of reader that can receive and read data from game media 12. In some embodiments, the game media reader 22 may be optional or omitted. For example, game content or applications may be accessed over a network via the network I/O 38 rendering the game media reader 22 and/or the game media 12 optional.

The user computing system 110 may include a separate graphics processor 24. In some cases, the graphics processor 24 may be built into the processing unit 20, such as with an APU. In some such cases, the graphics processor 24 may share Random Access Memory (RAM) with the processing unit 20. Alternatively, or in addition, the user computing system 110 may include a discrete graphics processor 24 that is separate from the processing unit 20. In some such cases, the graphics processor 24 may have separate RAM from the processing unit 20. Further, in some cases, the graphics processor 24 may work in conjunction with one or more additional graphics processors and/or with an embedded or non-discrete graphics processing unit, which may be embedded into a motherboard and which is sometimes referred to as an on-board graphics chip or device.

The user computing system 110 also includes various components for enabling input/output, such as an I/O 32, a user I/O 34, a display I/O 36, and a network I/O 38. As previously described, the input/output components may, in some cases, including touch-enabled devices. The I/O 32 interacts with storage element 40 and, through a device 42, removable storage media 44 in order to provide storage for the user computing system 110. Processing unit 20 can communicate through I/O 32 to store data, such as game state data and any shared data files. In addition to storage 40 and removable storage media 44, the user computing system 110 is also shown including ROM (Read-Only Memory) 46 and RAM 48. RAM 48 may be used for data that is accessed frequently, such as when a game is being played, or for all data that is accessed by the processing unit 20 and/or the graphics processor 24.

User I/O 34 is used to send and receive commands between processing unit 20 and user devices, such as game controllers. In some embodiments, the user I/O 34 can include touchscreen inputs. As previously described, the touchscreen can be a capacitive touchscreen, a resistive touchscreen, or other type of touchscreen technology that is configured to receive user input through tactile inputs from the user. Display I/O 36 provides input/output functions that are used to display images from the game being played. Network I/O 38 is used for input/output functions for a network. Network I/O 38 may be used during execution of a game, such as when a game is being played online or being accessed online.

Display output signals may be produced by the display I/O 36 and can include signals for displaying visual content produced by the user computing system 110 on a display device, such as graphics, user interfaces, video, and/or other visual content. The user computing system 110 may comprise one or more integrated displays configured to receive display output signals produced by the display I/O 36, which may be output for display to a user. According to some embodiments, display output signals produced by the display I/O 36 may also be output to one or more display devices external to the user computing system 110.

The user computing system 110 can also include other features that may be used with a game, such as a clock 50, flash memory 52, and other components. An audio/video player 56 might also be used to play a video sequence, such as a movie. It should be understood that other components may be provided in the user computing system 110 and that a person skilled in the art will appreciate other variations of the user computing system 110.

Program code can be stored in ROM 46, RAM 48, or storage 40 (which might comprise hard disk, other magnetic storage, optical storage, solid state drives, and/or other non-volatile storage, or a combination or variation of these). At least part of the program code can be stored in ROM that is programmable (ROM, PROM, EPROM, EEPROM, and so forth), in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM is used and holds data that is generated during the play of the game and portions thereof might also be reserved for frame buffers, game state and/or other data needed or usable for interpreting user input and generating game displays. Generally, RAM 48 is volatile storage and data stored within RAM 48 may be lost when the user computing system 110 is turned off or loses power.

As user computing system 110 reads game media 12 and provides a game, information may be read from game media 12 and stored in a memory device, such as RAM 48. Additionally, data from storage 40, ROM 46, servers accessed via a network (not shown), or removable storage media 46 may be read and loaded into RAM 48. Although data is described as being found in RAM 48, it will be understood that data does not have to be stored in RAM 48 and may be stored in other memory accessible to processing unit 20 or distributed among several media, such as game media 12 and storage 40.

Additional Embodiments

It is to be understood that not necessarily all objects or advantages may be achieved in accordance with any particular embodiment described herein. Thus, for example, those skilled in the art will recognize that certain embodiments may be configured to operate in a manner that achieves, increases, or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computer-implemented method comprising:
as implemented by an interactive computing system configured with specific computer-executable instructions,
selecting a plurality of users eligible to play an instance of a video game;
creating a data structure representation of the plurality of users such that each user from the plurality of users is linked within the data structure with at least one other user from the plurality of users to form potential matchmaking pairs of users to play the instance of the video game;
accessing user data for each user of the plurality of users, the user data corresponding to the user's interaction with the video game;
for each link within the data structure, assigning a weight based at least in part on a first output of a parameter function and a second output of the parameter function, wherein the first output of the parameter function is based at least in part on user data of a first user associated with the link within the data structure and the second output of the parameter function is based at least in part on user data of a second user associated with the link within the data structure;
selecting a set of links from the data structure based at least in part on the weights assigned to each link; and
assigning at least a pair of users from the plurality of users to play the instance of the video game, wherein the pair of users corresponds to a pair of users linked together within the data structure by a link from the selected set of links.

2. The computer-implemented method of claim 1, wherein the data structure comprises a connected graph with each user from the plurality of users represented by a node within the connected graph and each potential matchmaking pair represented by an edge between nodes of the connected graph.

3. The computer-implemented method of claim 1, further comprising determining the first output of the parameter function by applying at least the user data of the first user to the parameter function.

4. The computer-implemented method of claim 1, further comprising determining the first output of the parameter function by applying at least the user data of the first user as a first input and the user data of the second user as a second input to the parameter function.

5. The computer-implemented method of claim 4, further comprising determining the second output of the parameter function by applying at least the user data of the first user as the second input and the user data of the second user as the first input to the parameter function, and wherein the first output of the parameter function differs from the second output of the parameter function.

6. The computer-implemented method of claim 1, wherein the user data of the first user comprises user interaction data corresponding to the first user's interaction with the video game and profile data associate with the first user.

7. The computer-implemented method of claim 1, further comprising generating the parameter function based at least in part on applying historical user data of a set of users to a machine learning algorithm.

8. The computer-implemented method of claim 1, further comprising predicting a match outcome for the instance of the video game based at least in part on the user data of the first user associated with the link and the user data of the second user associated with the link.

9. The computer-implemented method of claim 8, further comprising determining the first output of the parameter function by applying at least the user data of the first user associated with the link and the predicted match outcome to the parameter function.

10. The computer-implemented method of claim 1, wherein the first output of the parameter function comprises a churn prediction, a retention prediction, or a prediction the first user associated with the link completes a match in the instance of the video game.

11. The computer-implemented method of claim 1, further comprising selecting the set of links from the data structure by at least solving a minimum weight matching problem for the data structure based at least in part on the weights assigned to each link within the data structure.

12. The computer-implemented method of claim 1, wherein:
at least said creating the data structure occurs during a first time period; and
at least said selecting the set of links occurs during a second time period that is later than the first time period.

13. The computer-implemented method of claim 1, further comprising:
determining that at least at least one user of the plurality of users is no longer available;
selecting an updated plurality of users eligible to play the instance of the video game that does not include the at least one user who is no longer available; and
updating the data structure based on the updated plurality of users.

14. A system comprising:
an electronic data store configured to store user data for users of a video game;
a hardware processor in communication with the electronic data store, the hardware processor configured to execute specific computer-executable instructions to at least:
select a plurality of users eligible to play an instance of the video game;
create a data structure representation of the plurality of users such that each user from the plurality of users is linked within the data structure with at least one other user from the plurality of users to form potential matchmaking pairs of users to play the instance of the video game;
access user data from the electronic data store for each user of the plurality of users, the user data corresponding to the user's interaction with the video game;
for each link within the data structure, assign a weight based at least in part on a first output of a parameter function and a second output of the parameter function, wherein the first output of the parameter function is based at least in part on user data of a first user associated with the link within the data structure and the second output of the parameter function is based at least in part on user data of a second user associated with the link within the data structure;
select a set of links from the data structure based at least in part on the weights assigned to each link; and
assign at least a pair of users from the plurality of users to play the instance of the video game, wherein the pair of users corresponds to a pair of users linked together within the data structure by a link from the selected set of links.

15. The system of claim 14, wherein the hardware processor is further configured to:
determine the first output of the parameter function by applying at least the user data of the first user as a first input and the user data of the second user as a second input to the parameter function; and
determine the second output of the parameter function by applying at least the user data of the first user as the second input and the user data of the second user as the first input to the parameter function, and wherein the first output of the parameter function differs from the second output of the parameter function.

16. The system of claim 14, wherein the hardware processor is further configured to generate the parameter function by at least applying a machine learning process to historical user interaction data of a set of users.

17. The system of claim 14, wherein the hardware processor is further configured to:
predict a match outcome for the instance of the video game based at least in part on the user data of the pair of users assigned to play the instance of the video game; and
determine the first output of the parameter function by applying at least the user data of the first user and the predicted match outcome to the parameter function.

18. The system of claim 14, wherein the hardware processor is further configured to solve a minimum weight matching problem for the data structure based at least in part on the weights assigned to each link within the data structure.

19. A non-transitory computer-readable storage medium storing computer executable instructions that, when executed by one or more computing devices, configure the one or more computing devices to perform operations comprising:
selecting a plurality of users eligible to play an instance of a video game;
creating a data structure representation of the plurality of users such that each user from the plurality of users is linked within the data structure with at least one other user from the plurality of users to form potential matchmaking pairs of users to play the instance of the video game;

accessing user data for each user of the plurality of users, the user data corresponding to the user's interaction with the video game;

for each link of a set of links within the data structure, assigning a weight based at least in part on a first output of a parameter function and a second output of the parameter function, wherein the first output of the parameter function is based at least in part on user data of a first user associated with the link within the data structure and the second output of the parameter function is based at least in part on user data of a second user associated with the link within the data structure;

selecting a subset of links from the data structure based at least in part on the weights assigned to each link; and assigning at least a pair of users from the plurality of users to play the instance of the video game, wherein the pair of users corresponds to a pair of users linked together within the data structure by a link from the selected subset of links.

20. The computer-readable, non-transitory storage medium of claim 19, further comprising:

determining the first output of the parameter function by applying at least the user data of the first user as a first input and the user data of the second user as a second input to the parameter function; and determining the second output of the parameter function by applying at least the user data of the first user as the second input and the user data of the second user as the first input to the parameter function, and wherein the first output of the parameter function differs from the second output of the parameter function.

\* \* \* \* \*